(12) United States Patent
Keel et al.

(10) Patent No.: US 11,378,690 B2
(45) Date of Patent: Jul. 5, 2022

(54) TIME OF FLIGHT SENSOR, A THREE-DIMENSIONAL IMAGING DEVICE USING THE SAME, AND A METHOD FOR DRIVING THE THREE-DIMENSIONAL IMAGING DEVICE

(71) Applicant: SAMSUNG ELECTRONICS CO., LTD., Suwon-si (KR)

(72) Inventors: Min Sun Keel, Hwaseong-si (KR); Gal Bitan, Hwaseong-si (KR); Amit Eisenberg, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 818 days.

(21) Appl. No.: 16/207,933

(22) Filed: Dec. 3, 2018

(65) Prior Publication Data

US 2019/0293792 A1 Sep. 26, 2019

(30) Foreign Application Priority Data

Mar. 21, 2018 (KR) .................... 10-2018-0032892

(51) Int. Cl.
*G01S 17/36* (2006.01)
*H04N 5/335* (2011.01)
*G01C 3/08* (2006.01)
*G01S 7/491* (2020.01)
*G01S 17/894* (2020.01)

(52) U.S. Cl.
CPC ............... *G01S 17/36* (2013.01); *G01C 3/08* (2013.01); *G01S 7/491* (2013.01); *G01S 17/894* (2020.01); *H04N 5/335* (2013.01)

(58) Field of Classification Search
CPC ........ G01S 17/36; G01S 17/894; G01S 7/491; G01C 3/08; H04N 5/335
See application file for complete search history.

(56) References Cited

U.S. PATENT DOCUMENTS

| | | | |
|---|---|---|---|
| 7,450,220 B2 | 11/2008 | O'Connor et al. | |
| 7,498,621 B2 | 3/2009 | Seitz | |
| 7,759,624 B2 | 7/2010 | Tachino et al. | |
| 7,884,310 B2 | 2/2011 | Buettgen | |

(Continued)

FOREIGN PATENT DOCUMENTS

| | | |
|---|---|---|
| KR | 10-1565969 | 10/2015 |
| KR | 10-1788032 | 10/2017 |

*Primary Examiner* — Hovhannes Baghdasaryan
(74) *Attorney, Agent, or Firm* — F. Chau & Associates, LLC

(57) ABSTRACT

A time of flight (ToF) sensor includes: a first pixel including a first photogate to receive light reflected by an object and generate a first phase signal, and a second photogate to generate a second phase signal having a phase difference of 180 degrees with respect to the first phase signal; a second pixel including a third photogate to receive the reflected light and generate a third phase signal different from the first phase signal and a fourth photogate to generate a fourth phase signal having a phase difference of 180 degrees with respect to the third phase signal; a first signal output unit to output the first and second phase signals; and a second signal output unit to output the third and fourth phase signals, wherein the first, second, third and fourth photogates output the first to fourth phase signals during a frame period.

20 Claims, 20 Drawing Sheets

(56) References Cited

U.S. PATENT DOCUMENTS

| | | | |
|---|---|---|---|
| 8,482,722 B2 | 7/2013 | Min et al. | |
| 8,908,156 B2 * | 12/2014 | Ohtomo | G01S 17/36 |
| | | | 356/4.1 |
| 8,953,152 B2 | 2/2015 | Min et al. | |
| 9,140,795 B2 | 9/2015 | Lehmann et al. | |
| 9,442,196 B2 | 9/2016 | Buettgen et al. | |
| 9,921,298 B2 * | 3/2018 | Cardei | G01S 7/4808 |
| | | | 356/5.01 |
| 2014/0198183 A1 * | 1/2014 | Kim | H04N 13/0257 |
| | | | 348/46 |
| 2017/0024894 A1 | 1/2017 | Cardei | |

* cited by examiner

820

830

850

880

890

TIME OF FLIGHT SENSOR, A THREE-DIMENSIONAL IMAGING DEVICE USING THE SAME, AND A METHOD FOR DRIVING THE THREE-DIMENSIONAL IMAGING DEVICE

CROSS-REFERENCE TO RELATED APPLICATION

This U.S. non-provisional patent application claims priority under 35 U.S.C. § 119 to Korean Patent Application No. 10-2018-0032892, filed on Mar. 21, 2018, in the Korean Intellectual Property Office (KIPO), the disclosure of which is incorporated by reference herein in its entirety.

1. Technical Field

The present inventive concept relates to a time of flight (ToF) sensor, a three-dimensional (3D) imaging device for acquiring a 3D image by using the ToF sensor, and a method of driving the 3D imaging device.

2. Discussion of Related Art

Technology for acquiring distance information by measuring the distance from an object, which is used in 3D cameras, motion sensors and laser radars, is now being developed to provide quadcopters, autonomous vehicles, motion recognition control, virtual reality, augmented reality, 3D games, robot control, and 3D images with the ability to yield depth perception.

Depth information of an object (e.g., distance information between the object and a camera) can be obtained through stereo vision by employing two cameras or triangulation employing structured light. However, the accuracy of the depth information acquired by these methods degrades when the distance between an object and a camera increases. A 3D imaging device employing a ToF sensor may emit infrared rays to an object and then acquire depth information of the object by measuring a time taken for a light receiver of the ToF sensor to receive infrared rays reflected by the object. The ToF sensor method permits high-speed operation, and generates less noise than a stereo vision method. In addition, the ToF sensor method can reduce the amount of calculation of a post-processing algorithm. The ToF sensor method makes it possible to acquire 3D depth information in a map form. In addition, the ToF sensor method requires sensor images of two frames having a phase difference of 180 degrees or sensor images of four frames having a phase difference of 90 degrees to generate one depth information map. For this reason, when a depth information map is generated, a motion artifact or motion blur appears due to motion of an object. Furthermore, additional frame memory is required to calculate depth values of an object, when employing the ToF sensor method.

SUMMARY OF THE INVENTION

A ToF sensor according to an exemplary embodiment of the present inventive concept includes a first pixel including a first photogate configured to receive light reflected by an object and generate a first phase signal, and a second photogate configured to generate a second phase signal having a phase difference of 180 degrees with respect to the first phase signal; a second pixel including a third photogate configured to receive the light reflected by the object and generate a third phase signal different from the first phase signal and a fourth photogate configured to generate a fourth phase signal having a phase difference of 180 degrees with respect to the third phase signal; a first signal output unit configured to output the first phase signal and the second phase signal; and a second signal output unit configured to output the third phase signal and the fourth phase signal, wherein the first, second, third and fourth photogates output the first, second, third and fourth phase signals during a frame period. A ToF sensor according to an exemplary embodiment of the present inventive concept includes first pixel groups including a plurality of pixels disposed adjacent to each other; and second pixel groups including a plurality of pixels disposed adjacent to each other, wherein each of the plurality of pixels of the first pixel groups receives light reflected by an object and outputs a first phase signal and a second phase signal having a phase difference of 180 degrees, and each of the plurality of pixels of the second pixel groups receives the light reflected by the object and outputs a third phase signal and a fourth phase signal having a phase difference of 180 degrees.

A ToF sensor according to an exemplary embodiment of the present inventive concept includes a first pixel group including a plurality of first pixels disposed to adjoin each other, wherein the plurality of first pixels is driven for a first time period to output a first phase signal and a second phase signal different from each other; a second pixel group including a plurality of second pixels disposed to adjoin each other, wherein the plurality of second pixels is driven for the first time period to output a third phase signal and a fourth phase signal different from each other; a third pixel group including a plurality of third pixels disposed to adjoin each other, wherein the plurality of third pixels is driven for a second time period, which is shorter than the first time period, to output a fifth phase signal and a sixth phase signal different from each other; and a fourth pixel group including a plurality of fourth pixels disposed to adjoin each other, wherein the plurality of fourth pixels is driven for the second time period to output a seventh phase signal and an eighth phase signal different from each other.

A three-dimensional (3D) imaging device according to an exemplary embodiment of the present inventive concept includes a light source configured to emit light to an object; a light source driver configured to supply a driving voltage to the light source; a time of flight (ToF) sensor including a plurality of first pixels configured to receive light reflected by the object and output a first phase signal and a second phase signal having a phase difference of 180 degrees and a plurality of second pixels configured to receive the light reflected by the object and output a third phase signal and a fourth phase signal having a phase difference of 180 degrees; a sensor driver configured to control driving of the ToF sensor by supplying a driving signal to the ToF sensor; a phase pattern processor configured to receive and convert the first phase signal, the second phase signal, the third phase signal, and the fourth phase signal into digital phase values and generate a phase pattern image by arranging the digital phase values in one frame; and a depth information generator configured to generate depth information of the object based on the phase pattern image.

A method of driving a 3D imaging device according to an exemplary embodiment of the present inventive concept includes: receiving, by a first photogate and a second photogate of a first pixel, light and outputting a first phase signal and a second phase signal having a phase difference of 180 degrees; receiving, by a third photogate and a fourth photogate of a second pixel, the light and outputting a third phase signal and a fourth phase signal having a phase difference of 180 degrees; receiving and converting the first phase signal, the second phase signal, the third phase signal, and the fourth phase signal into digital phase values and generating a phase pattern image by arranging the digital phase values in one frame; and generating depth information of an object based on the phase pattern image.

DETAILED DESCRIPTION OF THE EMBODIMENTS

Hereinafter, a time of flight (ToF) sensor and a three-dimensional (3D) imaging device employing the ToF sensor according to exemplary embodiments of the present inventive concept will be described with reference to the accompanying drawings.

Figure 1A:
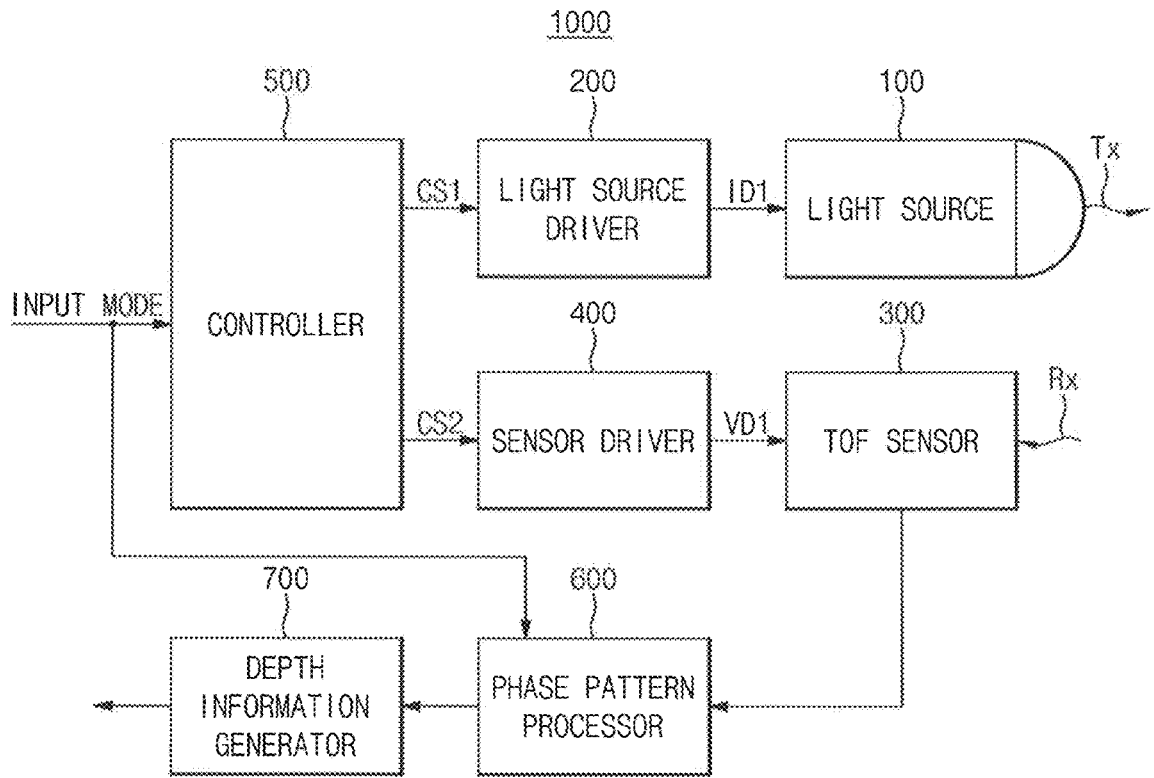
FIGS. 1A, 1B and 1C are diagrams showing a three-dimensional (3D) imaging device according to an exemplary embodiment of the present inventive concept.
Figure 1B:
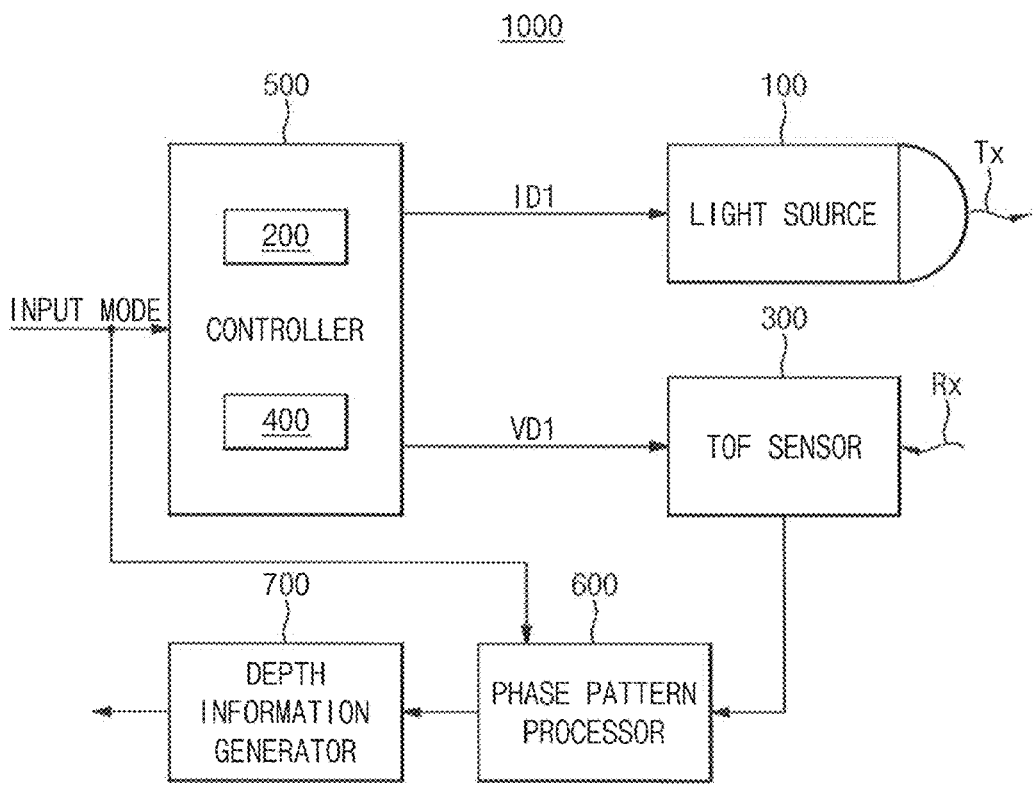
Figure 1C:
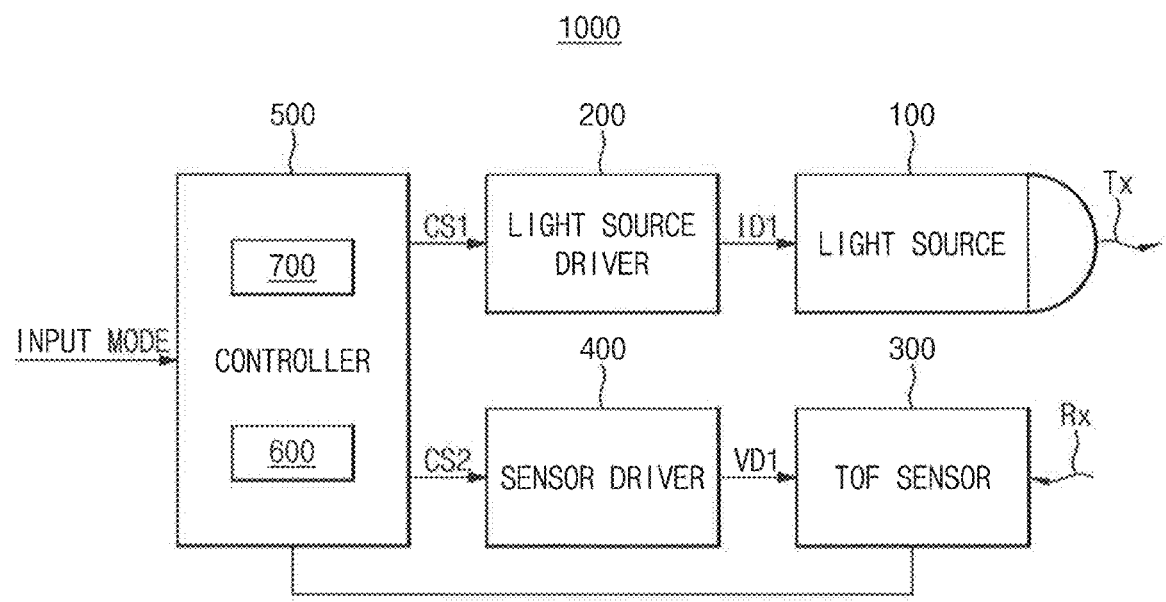
Figure 2:
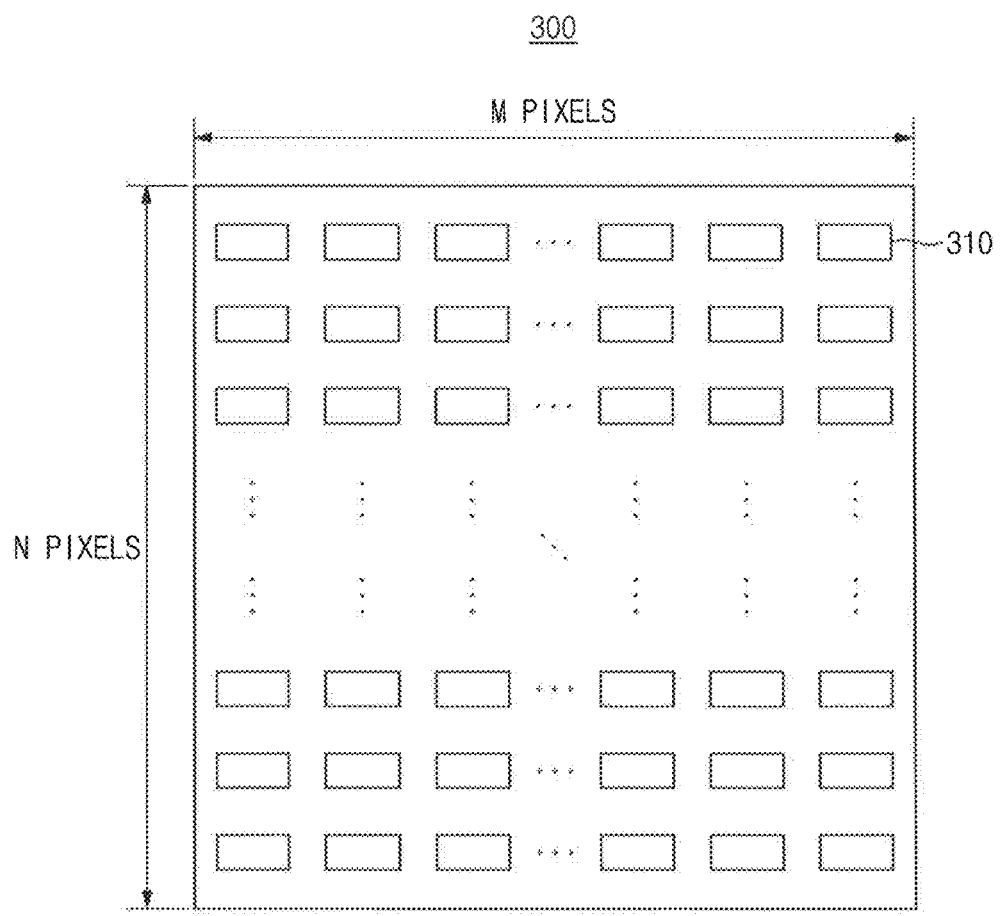
FIG. 2 is a diagram showing a time of flight (ToF) sensor of FIG. 1 according to an exemplary embodiment of the present inventive concept.

FIGS. 1A, 1B and 1C are diagrams showing a 3D imaging device according to an exemplary embodiment of the present inventive concept. FIG. 2 is a diagram showing a ToF sensor of FIG. 1 according to an exemplary embodiment of the present inventive concept.

Referring to FIGS. 1A and 2, a 3D imaging device 1000 according to an exemplary embodiment of the present inventive concept may generate depth information of an object on the basis of a phase difference between light emitted from a light source and light received after reflection from the object. To accomplish this, the 3D imaging device 1000 may include a light source 100, a light source driver 200, a ToF sensor 300, a sensor driver 400, a controller 500, a phase pattern processor 600, and a depth information generator 700.

The light source 100 may emit laser light of an infrared or visible light band, and the light emitted from the light source 100 may be reflected by an object and incident on the ToF sensor 300. The ToF sensor 300 may include a plurality of pixels 310, and light reflected by the object may be incident on the plurality of pixels 310. For example, the light source 100 may transmit (Tx) light and the ToF sensor 300 may receive (Rx) light.

The ToF sensor 300 may be composed of the plurality of pixels 310 arranged in a one-dimensional (1D) or a two-dimensional (2D) array. As an example, FIG. 2 shows a configuration of the ToF sensor 300 in which the plurality of pixels 310 are arranged in a 2D array. A configuration of the ToF sensor 300 in which M pixels 310 are arranged in a horizontal direction and N pixels 310 are arranged in a vertical direction is shown by way of example. As an example, M pixels arranged in a horizontal direction in the same row may constitute one pixel array, and the ToF sensor 300 may be composed of N pixel arrays. As an example, N pixels arranged in a vertical direction in the same column may constitute one pixel array, and the ToF sensor 300 may be composed of M pixel arrays.

The ToF sensor 300 may be driven by a sensor driving signal VD1 supplied from the sensor driver 400.

The light source 100 may be composed of a light-emitting diode (LED) or a laser diode (LD). The light source 100 may be connected to the light source driver 200 and driven by a light source driving current ID1 supplied from the light source driver 200. The light source 100 may emit light in the form of a pulse wave. As an example, the light source 100 may emit light in the form of a sine wave, a triangle wave, or a square wave. The light emitted from the light source 100 may be reflected by an object and thereafter be incident on the ToF sensor 300. In addition, the light emitted from the light source 100 and the light incident on the ToF sensor 300 may have a phase difference according to the distance between the light source 100 and the object. It is possible to calculate a depth of the object, in other words, the distance, by detecting such a phase difference of light. The 3D imaging device 1000 may include the light source 100 and the ToF sensor 300 which includes at least one pixel 310 to measure the distance from one point of an object thereto. In addition, the 3D imaging device 1000 may include one or more light sources 100 and the ToF sensor 300 which includes a plurality of pixels 310 to measure distances from a plurality of objects thereto.

The controller 500 may be connected to the light source driver 200 and the sensor driver 400. The controller 500 may generate a light source control signal CS1 to control the light source driver 200. Here, the controller 500 may generate the light source control signal CS1 on the basis of an input mode or a preset mode. The controller 500 may supply the generated light source control signal CS1 to the light source driver 200.

The controller 500 may generate a sensor control signal CS2 to control the sensor driver 400 and supply the generated sensor control signal CS2 to the sensor driver 400. The controller 500 may generate the sensor control signal CS2 so that the sensor driver 400 may interoperate with the light source driver 200 when the light source driver 200 is driven by the light source control signal CS1. Here, the controller 500 may generate the sensor control signal CS2 on the basis of an input mode or a preset mode. The controller 500 may supply the generated sensor control signal CS2 to the sensor driver 400. Each of the pixels 310 may be driven in synchronization with the light emitted from the light source 100 due to the light source control signal CS1 and the sensor control signal CS2 output from the controller 500.

Depending on a system to which a ToF sensor and a 3D imaging device are applied, a required depth map may vary. As an example, when a ToF sensor and a 3D imaging device are applied to a robot vacuum cleaner, a depth map whose resolution may be increased in a horizontal (e.g., X-axis) direction rather than a vertical (e.g., Y-axis) direction may be required. In this case, it is necessary to generate a phase pattern for increasing a resolution in the horizontal (e.g., X-axis) direction. In addition, when a ToF sensor and a 3D imaging device are applied to an apparatus moving in the vertical direction, a depth map whose resolution may be increased in the vertical (e.g., Y-axis) direction rather than the horizontal (e.g., X-axis) direction may be required. In this case, it is necessary to generate a phase pattern for increasing a resolution in the vertical (e.g., Y-axis) direction. Further, when a ToF sensor and a 3D imaging device are applied to an augmented reality headset or a drone, a depth map from which it is possible to obtain a certain level of resolution in the horizontal (e.g., X-axis) direction and the vertical (e.g., Y-axis) direction may be required. In this case, it is necessary to generate a phase pattern for obtaining the certain level of resolution in the horizontal (e.g., X-axis) direction and the vertical (e.g., Y-axis) direction.

A first mode which requires a depth map whose resolution may be increased in the X-axis direction may be input to or set in the controller 500 and the phase pattern processor 600. Here, the controller 500 may generate the light source control signal CS1 according to the first mode and supply the generated light source control signal CS1 to the light source driver 200. The controller 500 may generate the sensor control signal CS2 according to the first mode and supply the generated sensor control signal CS2 to the sensor driver 400.

A second mode which requires a depth map favorable for a Y-axis resolution may be input to or set in the controller 500 and the phase pattern processor 600. Here, the controller 500 may generate the light source control signal CS1 according to the second mode and supply the generated light source control signal CS1 to the light source driver 200. The controller 500 may generate the sensor control signal CS2 according to the second mode and supply the generated sensor control signal CS2 to the sensor driver 400.

A third mode which requires a depth map having a certain level of resolution in the X-axis direction and the Y-axis direction may be input to or set in the controller 500 and the phase pattern processor 600. Here, the controller 500 may generate the light source control signal CS1 according to the third mode and supply the generated light source control signal CS1 to the light source driver 200. The controller 500 may generate the sensor control signal CS2 according to the third mode and supply the generated sensor control signal CS2 to the sensor driver 400.

The light source driver 200 is connected to the controller 500 and may generate the light source driving current ID1 for driving the light source 100 on the basis of the light source control signal CS1 input from the controller 500. In other words, the light source driver 200 may generate the light source driving current ID1 in response to the light source control signal CS1. The light source driver 200 may supply the generated light source driving current ID1 to the light source 100. An intensity and a wavelength of the light emitted from the light source 100 may be adjusted corresponding to the light source driving current ID1 supplied from the light source driver 200 to the light source 100. As an example, an intensity and a wavelength of the light emitted from the light source 100 may increase in proportion to the light source driving current ID supplied to the light source 100.

Referring to FIG. 1B, the light source driver 200 and the sensor driver 400 may be integrally disposed in the controller 500. In this case, the light source driver 200, the sensor driver 400, and the controller 500 may be integrated into a system on chip (SoC). Without being limited thereto, the sensor driver 400 and the controller 500 may be integrally disposed, and the light source driver 200 may be disposed as a separate element.

Referring to FIG. 1C, the phase pattern processor 600 and the depth information generator 700 may be integrally disposed in the controller 500. In this case, the phase pattern processor 600, the depth information generator 700, and the controller 500 may be integrated into a SoC. Without being limited thereto, the phase pattern processor 600 and the depth information generator 700 may be integrally disposed in one chip, and the controller 500 may be disposed as a separate element. Without being limited thereto, the depth information generator 700 and the controller 500 may be integrally disposed in one chip, and the phase pattern processor 600 may be disposed as a separate element.

Figure 3A:
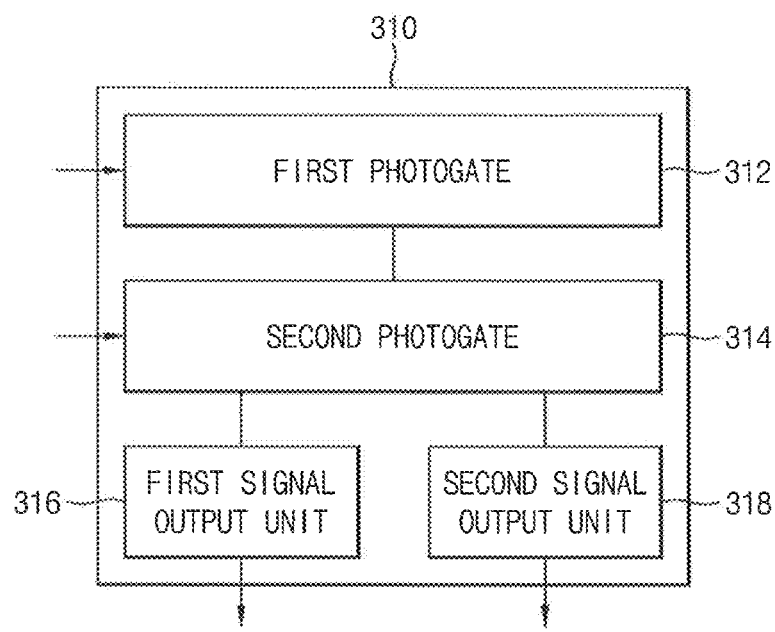
FIGS. 3A, 3B and 3C are diagrams showing one of a plurality of pixels constituting the ToF sensor of FIG. 2 according to an exemplary embodiment of the present inventive concept.
Figure 3B:
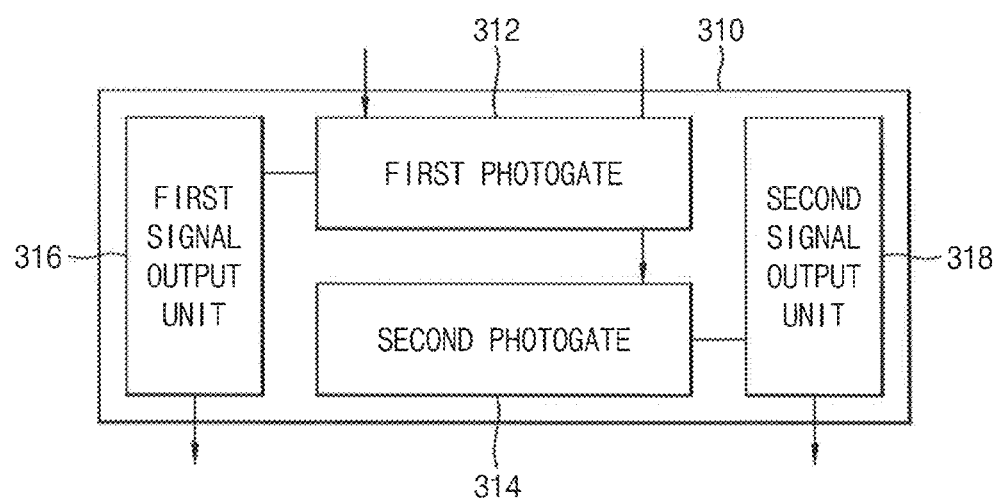
Figure 3C:
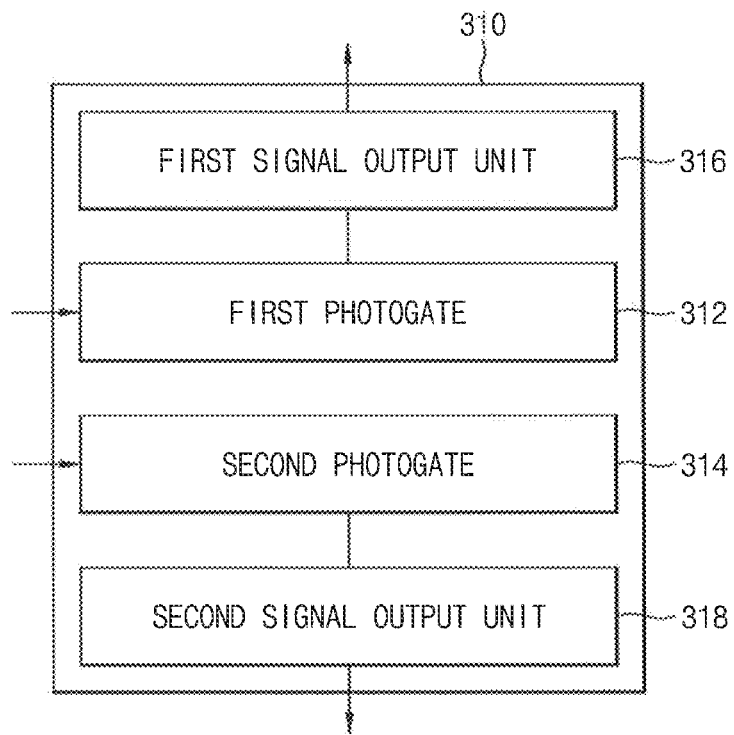

FIGS. 3A, 3B and 3C are diagrams showing one of a plurality of pixels constituting the ToF sensor of FIG. 2 according to an exemplary embodiment of the present inventive concept.

Referring to FIGS. 2 to 3C, each pixel 310 may be driven by a sensor driving signal VD1 supplied from the sensor driver 400, thereby receiving light reflected by an object. The pixels 310 may be configured in a 2-tap demodulation structure to sample two phase signals having a difference of 180 degrees. Each pixel 310 of the ToF sensor 300 may include a first photogate 312 and a second photogate 314. Each pixel 310 may include a first signal output unit 316 for outputting a phase signal corresponding to light received by the first photogate 312. In addition, each pixel 310 may include a second signal output unit 318 for outputting a phase signal corresponding to light received by the second photogate 314. In other words, each pixel 310 may be composed of two subpixels, and each subpixel may include one photogate 312 or 314 and one signal output unit 316 or 318. An output signal of the first photogate 312 and an output signal of the second photogate 314 of each pixel 310 may be input to the phase pattern processor 600.

As shown in FIG. 3A, a first photogate 312 and a second photogate 314 may be vertically disposed in sequence in a pixel 310, and a first signal output unit 316 and a second signal output unit 318 may be disposed below the first and second photogates 312 and 314. As shown in FIG. 3B, a first photogate 312 and a second photogate 314 may be disposed at the center (or a central portion) of a pixel 310, a first signal output unit 316 may be disposed next to the first photogate 312, and a second signal output unit 318 may be disposed next to the second photogate 314. As shown in FIG. 3C, a first photogate 312 and a second photogate 314 may be disposed at the center (or a central portion) of a pixel 310, a first signal output unit 316 may be disposed above the first photogate 312, and a second signal output unit 318 may be disposed below the second photogate 314.

The sensor driving signal VD1 supplied to each pixel 310 may include a first photogate driving signal for driving the first photogate 312 and a second photogate driving signal for driving the second photogate 314. The first photogate 312 may be driven by the first photogate driving signal to be synchronized with a first phase of the light emitted from the light source 100. The first photogate 312 may output a phase signal corresponding to the received light to the phase pattern processor 600 through the first signal output unit 316. The second photogate 314 may be driven by the second photogate driving signal to be synchronized with a second phase of the light emitted from the light source 100. The second photogate 314 may output a phase signal corresponding to the received light to the phase pattern processor 600 through the second signal output unit 318.

Figure 4A:
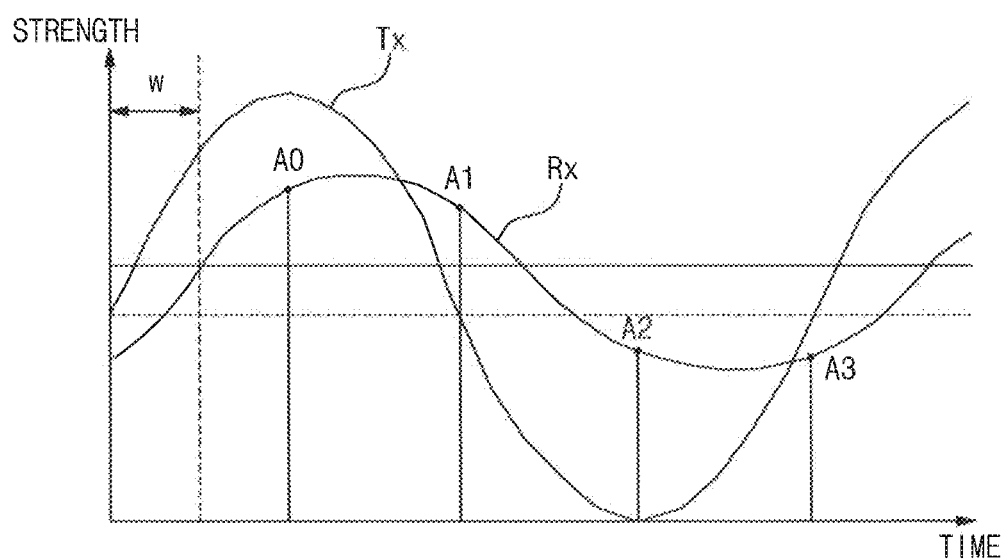
FIG. 4A is a graph showing four phases that a ToF sensor samples by receiving light reflected by an object according to an exemplary embodiment of the present inventive concept.
Figure 4B:
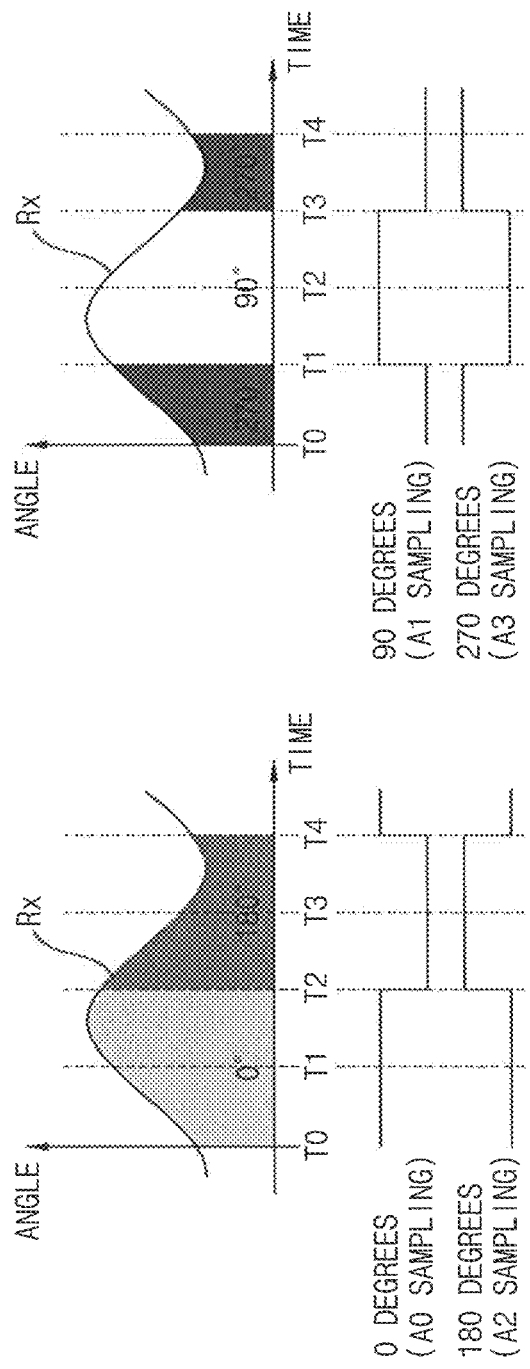
FIG. 4B shows graphs of a received light signal accumulated by a ToF sensor during a period from T0 to T3 according to an exemplary embodiment of the present inventive concept.

FIG. 4A is a graph showing four phases that a ToF sensor samples by receiving light reflected by an object according to an exemplary embodiment of the present inventive concept. The graph of FIG. 4A has an x-axis representing time and a y-axis representing signal strength, for example. FIG. 4B shows graphs of a received light signal accumulated by a ToF sensor during a period from T0 to T3 according to an exemplary embodiment of the present inventive concept.

Referring to FIGS. 1 to 4B, in the 3D imaging device 1000, light may be emitted from the light source 100 to measure the distance to an object, and then light reflected by the object may be received by a pixel 310. Here, the light source 100 may be turned on/off at a certain frequency, thereby modulating light. The first photogate 312 and the second photogate 314 of the pixel 310 may be driven to be synchronized with phases of the light emitted from the light source 100. The first photogate 312 and the second photogate 314 may be driven by the first photogate driving signal and the second photogate driving signal, thereby receiving the light reflected by the object. As shown in FIG. 4B, the first photogate 312 and the second photogate 314 may output phase signals sampled at four phase points (0 degrees, 90 degrees, 180 degrees, and 270 degrees) to measure a depth of the object, in other words, the distance from the object. After a time, which corresponds to a flight distance of the light emitted from the light source 100, elapses, the first and second photogates 312 and 314 receive the light.

In the case of 0 degrees, it is possible to accumulate light signals received by the first and second photogates 312 and 314 of the pixel 310 between a time point T0 and a time point T2. In the case of 90 degrees, it is possible to accumulate light signals received by the first and second photogates 312 and 314 of the pixel 310 between a time point T1 and a time point T3. In the case of 180 degrees, it is possible to accumulate light signals received by the first and second photogates 312 and 314 of the pixel 310 between the time point T2 and a time point T4. In the case of 270 degrees, it is possible to accumulate light signals received by the first and second photogates 312 and 314 of the pixel 310 between the time point T0 and the time point T1, as well as between the time point T3 and the time point T4.

One cycle of a signal starts from the time point T0 and ends at the time point T4, and when one cycle of the signal ends, next cycles are continuously repeated. Such signal cycles may be repeated multiple times (e.g., several thousands of times to several hundreds of thousand times). As an example, when a light signal cycle is 10 ns (modulated at 100 MHz) and a signal is accumulated for about 1 ms, an accumulation operation may be performed during 100,000 cycles.

The first photogate 312 of the pixel 310 may be driven by the first photogate driving signal input from the sensor driver 400. Here, the first photogate driving signal may be generated so that the first photogate 312 may be synchronized with 0-degree, 90-degree, 180-degree, and 270-degree phases of the light emitted from the light source 100. The first photogate 312 of the pixel 310 may be driven by the first photogate driving signal, thereby receiving the light reflected by the object. The first photogate 312 may operate in synchronization with at least one phase among initial 0-degree, 90-degree, 180-degree, and 270-degree phases of the light emitted from the light source 100. The first photogate 312 may accumulate a signal of the light received after reflection from the object and output a phase signal corresponding to the accumulated received light signal through the first signal output unit 316.

The second photogate 314 of the pixel 310 may be driven by the second photogate driving signal input from the sensor driver 400. Here, the second photogate 314 of the pixel 310 may operate in synchronization with a phase of the light emitted from the light source 100, thereby receiving light. The second photogate driving signal may be generated so that the second photogate 314 may be synchronized with 0-degree, 90-degree, 180-degree, and 270-degree phases of the light emitted from the light source 100. The second photogate driving signal may be generated to have a phase difference of 180 degrees with respect to the first photogate driving signal. The second photogate 314 of the pixel 310 may be driven by the second photogate driving signal, thereby receiving the light reflected by the object.

The second photogate 314 may accumulate a phase signal corresponding to the light received after reflection from the object and output a phase signal corresponding to the accumulated received light signal through the second signal output unit 318. Here, the second photogate 314 may operate to have a phase difference of 180 degrees with respect to the first photogate 312 and output a phase signal having a phase difference of 180 degrees with respect to the phase signal of the first photogate 312. In other words, the first photogate 312 and the second photogate 314 may be driven to have a phase difference of 180 degrees with respect to an initial phase of the light emitted from the light source 100. Therefore, the phase signals output from the first photogate 312 and the second photogate 314 may have a difference of 180 degrees.

Figure 5:
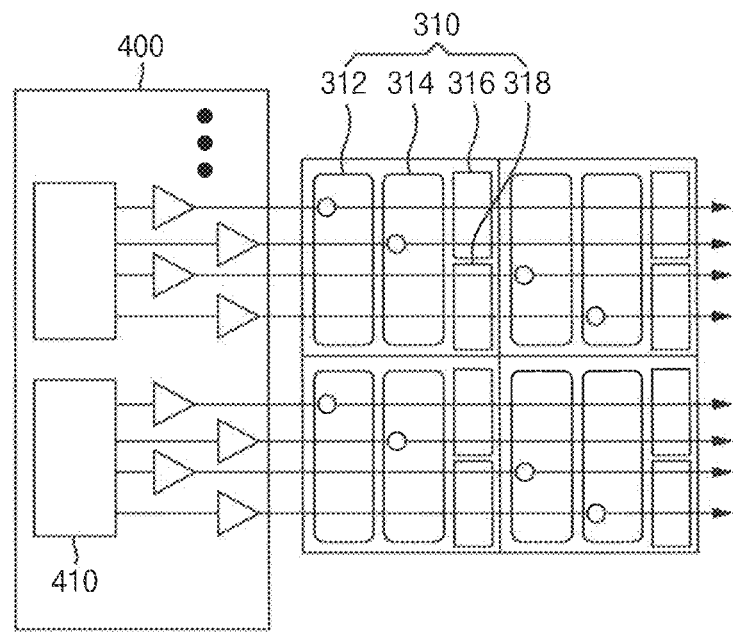
FIG. 5 is a diagram showing a driving circuit disposed in a horizontal direction of a ToF sensor configured in a 2-tap structure and connected to the ToF sensor according to an exemplary embodiment of the present inventive concept.
Figure 6:
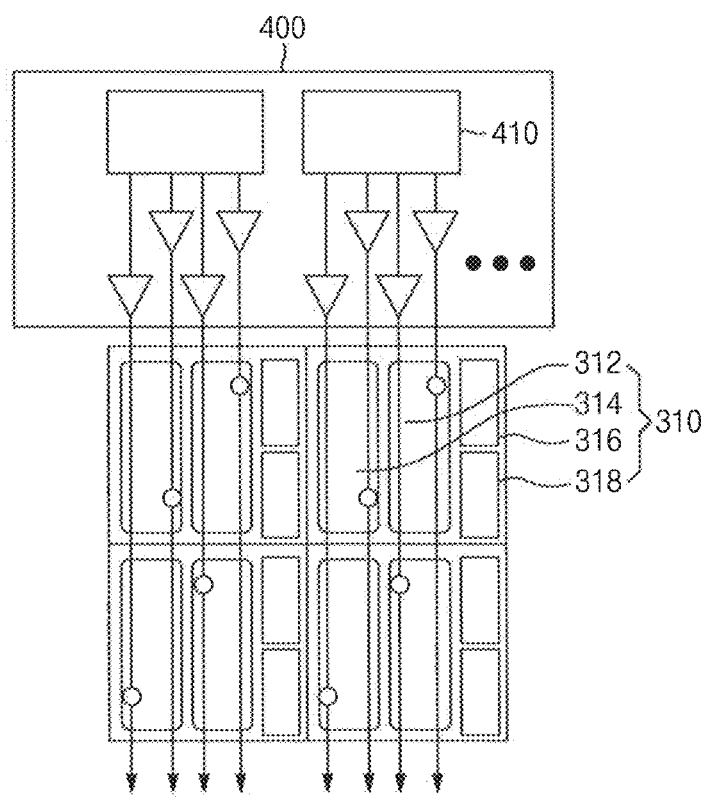
FIG. 6 is a diagram showing a driving circuit disposed in a vertical direction of a ToF sensor configured in a 2-tap structure and connected to the ToF sensor according to an exemplary embodiment of the present inventive concept.

FIG. 5 is a diagram showing a driving circuit disposed in a horizontal direction of a ToF sensor configured in a 2-tap structure and connected to the ToF sensor according to an exemplary embodiment of the present inventive concept. FIG. 6 is a diagram showing a driving circuit disposed in a vertical direction of a ToF sensor configured in a 2-tap structure and connected to the ToF sensor according to an exemplary embodiment of the present inventive concept.

Referring to FIGS. 1A, 5, and 6, the sensor driver 400 may be connected to the controller 500. The sensor driver 400 may generate the sensor driving signal VD1 for driving each of the pixels 310 on the basis of the sensor control signal CS2 input from the controller 500. In other words, the sensor driver 400 may generate the sensor driving control signal VD1 in response to the sensor control signal CS2. The sensor driver 400 may supply the generated sensor driving signal VD1 to each of the pixels 310. The sensor driving signal VD1 may include the first photogate driving signal for driving the first photogates 312 and the second photogate driving signal for driving the second photogates 314.

The sensor driver 400 may include a plurality of signal output devices 410. Each of the signal output devices 410 includes a plurality of signal output channels, and one signal output channel may be connected to one photogate. One signal output device 410 may supply the first photogate driving signal and the second photogate driving signal to a plurality of pixels 310. FIG. 5 shows an example in which the sensor driver 400 is disposed in the X-axis direction of the ToF sensor 300 and the plurality of signal output devices 410 are connected to the plurality of pixels 310. FIG. 6 shows an example in which the sensor driver 400 is disposed in the Y-axis direction of the ToF sensor 300 and the plurality of signal output devices 410 are connected to the plurality of pixels 310. The plurality of signal output devices 410 may also be disposed in the X-axis and Y-axis directions of the ToF sensor 300. FIGS. 5 and 6 show that one signal output device 410 supplies the first photogate driving signal and the second photogate driving signal to each of two pixels 310. However, the present inventive concept is not limited thereto, and one signal output device 410 may supply the first photogate driving signal and the second photogate driving signal to one pixel 310 or each of three or more pixels 310.

The first photogates 312 may be driven to be synchronized with the first phase of the light emitted from the light source 100 by the first photogate driving signal supplied from the sensor driver 400 to the first photogates 312. The second photogates 314 may be driven to be synchronized with the second phase of the light emitted from the light source 100 by the second photogate driving signal supplied from the sensor driver 400 to the second photogates 314.

As an example, the sensor driver 400 may generate the first photogate driving signal so that the first photogates 312 may be driven in synchronization with an initial 0-degree phase of the light emitted from the light source 100. Accordingly, the first photogates 312 may be driven by the first photogate driving signal in synchronization with the initial 0-degree phase of the light emitted from the light source 100. The first photogates 312 may receive light reflected by an object according to the first photogate driving signal and accumulate the received light to output a 0-degree phase signal. The sensor driver 400 may generate the second photogate driving signal so that the second photogates 314 may be driven in synchronization with an initial 180-degree phase of the light emitted from the light source 100. Accordingly, the second photogates 314 may be driven by the second photogate driving signal in synchronization with the initial 180-degree phase of the light emitted from the light source 100. The second photogates 314 may receive the light reflected by the object according to the second photogate driving signal and accumulate the received light to output a 180-degree phase signal.

As an example, the sensor driver 400 may generate the first photogate driving signal so that the first photogates 312 may be driven in synchronization with an initial 90-degree phase of the light emitted from the light source 100. Accordingly, the first photogates 312 may be driven by the first photogate driving signal in synchronization with the initial 90-degree phase of the light emitted from the light source 100. The first photogates 312 may receive light reflected by an object according to the first photogate driving signal and accumulate the received light to output a 90-degree phase signal. The sensor driver 400 may generate the second photogate driving signal so that the second photogates 314 may be driven in synchronization with an initial 270-degree phase of the light emitted from the light source 100. Accordingly, the second photogates 314 may be driven by the second photogate driving signal in synchronization with the initial 270-degree phase of the light emitted from the light source 100. The second photogates 314 may receive the light reflected by the object according to the second photogate driving signal and accumulate the received light to output a 270-degree phase signal.

As an example, the sensor driver 400 may generate the first photogate driving signal so that the first photogates 312 may be driven in synchronization with the initial 180-degree phase of the light emitted from the light source 100. Accordingly, the first photogates 312 may be driven by the first photogate driving signal in synchronization with the initial 180-degree phase of the light emitted from the light source 100. The first photogates 312 may receive light reflected by an object according to the first photogate driving signal and accumulate the received light to output a 180-degree phase signal. The sensor driver 400 may generate the second photogate driving signal so that the second photogates 314 may be driven in synchronization with the initial 0-degree phase of the light emitted from the light source 100. Accordingly, the second photogates 314 may be driven by the second photogate driving signal in synchronization with the initial 0-degree phase of the light emitted from the light source 100. The second photogates 314 may receive the light reflected by the object according to the second photogate driving signal and accumulate the received light to output a 0-degree phase signal.

As an example, the sensor driver 400 may generate the first photogate driving signal so that the first photogates 312 may be driven in synchronization with the initial 270-degree phase of the light emitted from the light source 100. Accordingly, the first photogates 312 may be driven by the first photogate driving signal in synchronization with the initial 270-degree phase of the light emitted from the light source 100. The first photogates 312 may receive light reflected by an object according to the first photogate driving signal and accumulate the received light to output a 270-degree phase signal. The sensor driver 400 may generate the second photogate driving signal so that the second photogates 314 may be driven in synchronization with the initial 90-degree phase of the light emitted from the light source 100. Accordingly, the second photogates 314 may be driven by the second photogate driving signal in synchronization with the initial 90-degree phase of the light emitted from the light source 100. The second photogates 314 may receive the light reflected by the object according to the second photogate driving signal and accumulate the received light to output a 90-degree phase signal.

As described above, the first photogates 312 and the second photogates 314 may be driven with a phase difference of 180 degrees by the first photogate driving signal and the second photogate driving signal. The first photogates 312 and the second photogates 314 may output phase signals having a phase difference of 180 degrees.

Figure 7:
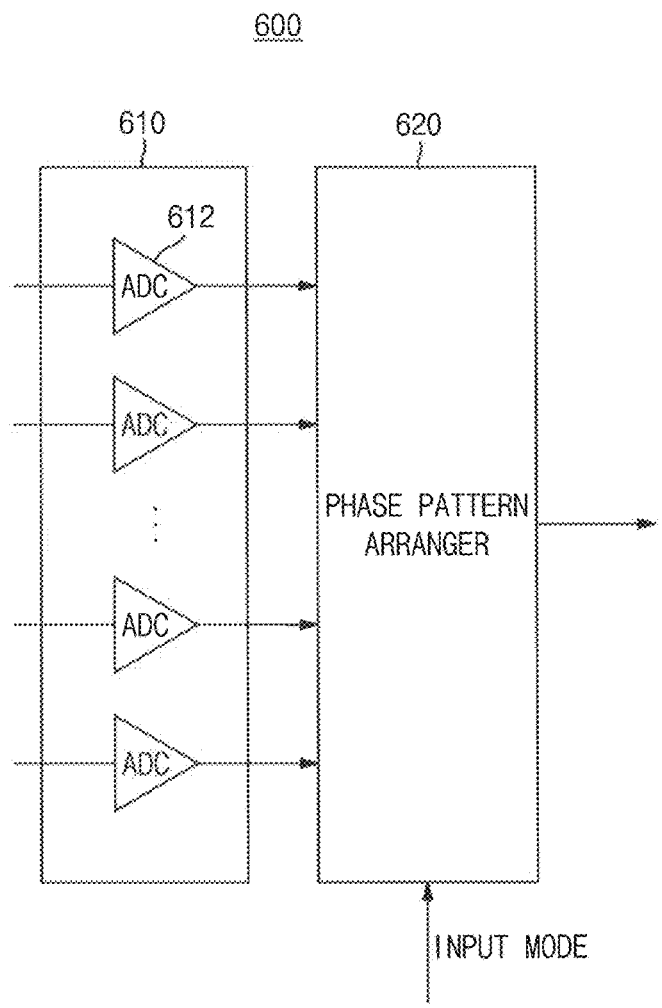
FIG. 7 is a diagram showing a phase pattern processor of FIG. 1 according to an exemplary embodiment of the present inventive concept.

FIG. 7 is a diagram showing a phase pattern processor of FIG. 1 according to an exemplary embodiment of the present inventive concept.

Referring to FIG. 7, the phase pattern processor 600 may generate a phase pattern image in units of frames so that the depth information generator 700 may generate a depth map. To accomplish this, the phase pattern processor 600 may include an analog-to-digital conversion unit 610 and a phase pattern arranger 620. In general, a plurality of frame images (e.g., four frame images) are used to generate a depth map, but according to an exemplary embodiment of the present inventive concept, the depth information generator 700 may generate a depth map by using a phase pattern image of one frame.

The analog-to-digital conversion unit 610 may be composed of a plurality of analog-to-digital converters (ADCs) 612. The ADCs 612 may correspond to pixels or photogates on a one-to-one basis. Each of the plurality of ADCs 612 may generate a digital phase value by converting a phase signal input from analog to digital for each pixel 310. Digital phase values generated by the plurality of ADCs 612 may be input to the phase pattern arranger 620.

The phase pattern arranger 620 includes a line memory of a certain capacity. The phase pattern arranger 620 may latch the digital phase values input from the ADCs 612 in the line memory and then generate a phase pattern image of one frame. Here, it is possible to generate the phase pattern image of one frame by arranging the digital phase values input from the ADCs 612 in a preset phase pattern. The phase pattern arranger 620 may generate a phase pattern image in units of frames. The phase pattern image of one frame may include phase data which is sensed in synchronization with the initial 0-degree, 90-degree, 180-degree, and 270-degree phases of the light emitted from the light source 100. In other words, the phase pattern arranger 620 may include phase data of 0 degrees, 90 degrees, 180 degrees, and 270 degrees in the phase pattern image of one frame. The phase pattern arranger 620 may generate the phase pattern image of one frame by arranging the phase data of 0 degrees, 90 degrees, 180 degrees, and 270 degrees in the preset phase pattern according to an input mode or a set mode. The phase pattern processor 600 may output the phase pattern image of one frame, which is generated according to the mode, to the depth information generator 700.

Figure 8:
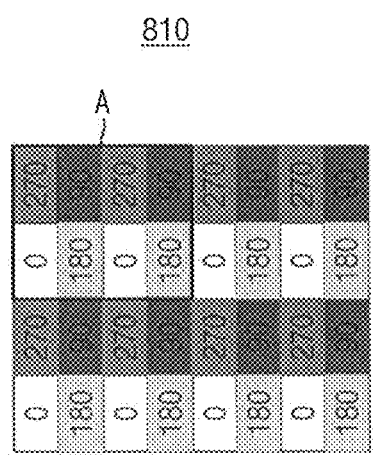
FIG. 8 is a diagram showing a phase pattern in which an X-axis resolution is taken into consideration according to an exemplary embodiment of the present inventive concept.
Figure 9:
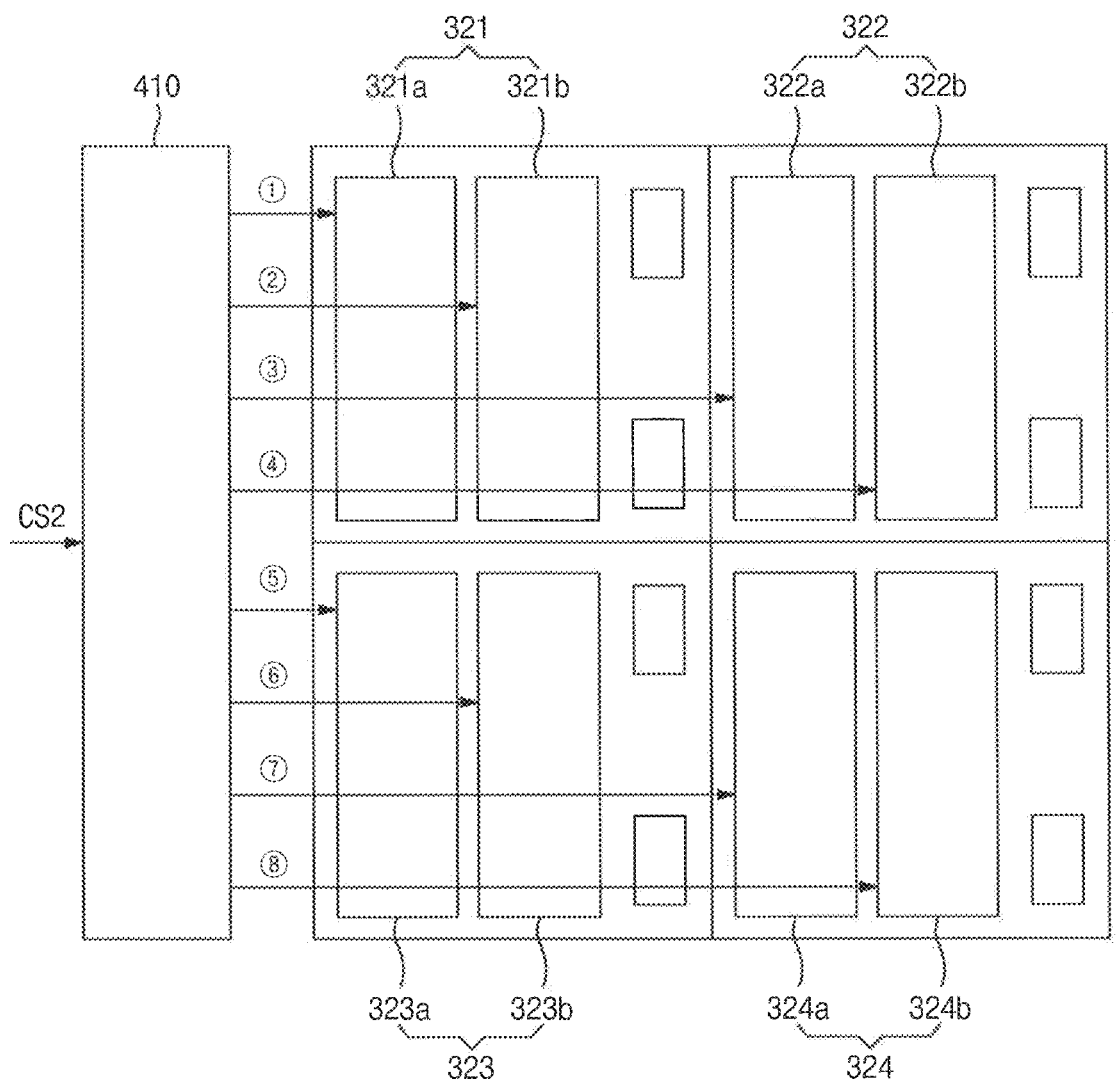
FIG. 9 is a diagram illustrating a method of driving a sensor driver and a ToF sensor for generating a phase pattern according to an exemplary embodiment of the present inventive concept.
Figure 10:
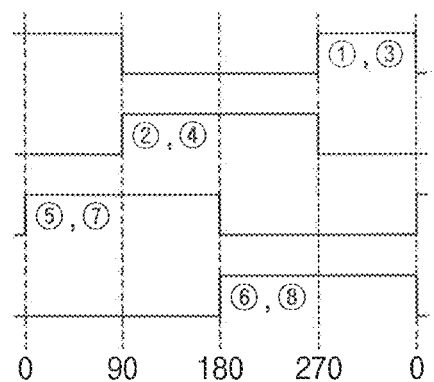
FIG. 10 is a timing diagram of control signals supplied from a sensor driver to respective pixels of a ToF sensor according to an exemplary embodiment of the present inventive concept.

FIG. 8 is a diagram showing a phase pattern in which an X-axis resolution is taken into consideration according to an exemplary embodiment of the present inventive concept. FIG. 9 is a diagram illustrating a method of driving a sensor driver and a ToF sensor for generating a phase pattern according to an exemplary embodiment of the present inventive concept. FIG. 10 is a timing diagram of control signals supplied from a sensor driver to respective pixels of a ToF sensor according to an exemplary embodiment of the present inventive concept. FIG. 8 shows a part of a phase pattern image, and FIG. 9 shows four pixels 321, 322, 323 and 324 among pixels constituting the ToF sensor 300.

Referring to FIGS. 8 to 10, the first pixel 321 and the second pixel 322 may be disposed adjacent to each other in the horizontal direction. The third pixel 323 and the fourth pixel 324 may be disposed adjacent to each other in the horizontal direction. The first pixel 321 and the second pixel 322 may be disposed in a first row, and the third pixel 323 and the fourth pixel 324 may be disposed in a second row. The first pixel 321 and the third pixel 323 may be disposed adjacent to each other in the vertical direction. The second pixel 322 and the fourth pixel 324 may be disposed adjacent to each other in the vertical direction. The first pixel 321 and the third pixel 323 may be disposed in a first column. The second pixel 322 and the fourth pixel 324 may be disposed in a second column.

The 3D imaging device 1000 according to an exemplary embodiment of the present inventive concept may calculate a depth of an object by using a phase pattern image of one frame. To accomplish this, respective pixels of the ToF sensor 300 may output four phase signals (0 degrees, 90 degrees, 180 degrees, and 270 degrees), which are sampled in synchronization with the initial phases of the light at 0 degrees, 90 degrees, 180 degrees, and 270 degrees, to the phase pattern processor 600. The phase pattern processor 600 may arrange the four phase signals (0 degrees, 90 degrees, 180 degrees, and 270 degrees) received from the ToF sensor 300 in a phase pattern image 810 of one frame. The phase pattern processor 600 may generate the phase pattern image 810 of one frame in a form in which a phase pattern of a region A shown in FIG. 8 is repeated.

To generate the phase pattern of the region A, a signal output device 410 of the sensor driver 400 may generate the sensor driving signal VD1 for driving the first pixel 321, the second pixel 322, the third pixel 323, and the fourth pixel 324 on the basis of the sensor control signal CS2 input from the controller 500. The signal output device 410 may supply the sensor driving signal VD1 to each of the first pixel 321, the second pixel 322, the third pixel 323, and the fourth pixel 324. The sensor driving signal VD1 may include a plurality of photogate driving signals ① to ⑧ for driving first photogates 321a, 322a, 323a, and 324a and second photogates 321b, 322b, 323b, and 324b included in the first pixel 321, the second pixel 322, the third pixel 323, and the fourth pixel 324. Accordingly, the first photogates 321a, 322a, 323a, and 324a and the second photogates 321b, 322b, 323b, and 324b included in the first pixel 321, the second pixel 322, the third pixel 323, and the fourth pixel 324 may be driven by the photogate driving signals ①  to ⑧ input from the signal output device 410. Each of the first photogates 321a, 322a, 323a, and 324a and the second photogates 321b, 322b, 323b, and 324b may output a phase signal of any one of 0 degrees, 90 degrees, 180 degrees, and 270 degrees during one frame period.

For example, the signal output device 410 may drive the first photogate 321a of the first pixel 321 to be synchronized with the initial phase of the light emitted from the light source 100 at 270 degrees among 0 degrees, 90 degrees, 180 degrees, and 270 degrees. To accomplish this, the signal output device 410 may supply the first photogate driving signal ① for driving the first photogate 321a of the first pixel 321 to the first photogate 321a of the first pixel 321. Accordingly, the first photogate 321a of the first pixel 321 may be driven by the first photogate driving signal ① input thereto, thereby generating a phase signal corresponding to the initial 270-degree phase of the light emitted from the light source 100. The first photogate 321a of the first pixel 321 may output the generated phase signal to the phase pattern processor 600. The signal output device 410 may drive the second photogate 321b of the first pixel 321 to be synchronized with the initial phase of the light emitted from the light source 100 at 90 degrees among 0 degrees, 90 degrees, 180 degrees, and 270 degrees. To accomplish this, the signal output device 410 may supply the second photogate driving signal ② for driving the second photogate 321b of the first pixel 321 to the second photogate 321b of the first pixel 321. Accordingly, the second photogate 321b of the first pixel 321 may be driven by the second photogate driving signal ② input thereto, thereby generating a phase signal corresponding to the initial 90-degree phase of the light emitted from the light source 100. The second photogate 321b of the first pixel 321 may output the generated phase signal to the phase pattern processor 600. As described above, the first photogate 321a and the second photogate 321b of the first pixel 321 may output the phase signals having a difference of 180 degrees.

The signal output device 410 may drive the first photogate 322a of the second pixel 322 to be synchronized with the initial phase of the light emitted from the light source 100 at 270 degrees among 0 degrees, 90 degrees, 180 degrees, and 270 degrees. To accomplish this, the signal output device 410 may supply the third photogate driving signal ③ for driving the first photogate 322a of the second pixel 322 to the first photogate 322a of the second pixel 322. Accordingly, the first photogate 322a of the second pixel 322 may be driven by the third photogate driving signal ③ input thereto, thereby generating a phase signal corresponding to the initial 270-degree phase of the light emitted from the light source 100. The first photogate 322a of the second pixel 322 may output the generated phase signal to the phase pattern processor 600. The signal output device 410 may drive the second photogate 322b of the second pixel 322 to be synchronized with the initial phase of the light emitted from the light source 100 at 90 degrees among 0 degrees, 90 degrees, 180 degrees, and 270 degrees. To accomplish this, the signal output device 410 may supply the fourth photogate driving signal ④ for driving the second photogate 322b of the second pixel 322 to the second photogate 322b of the second pixel 322. Accordingly, the second photogate 322b of the second pixel 322 may be driven by the fourth photogate driving signal ④ input thereto, thereby generating a phase signal corresponding to the initial 90-degree phase of the light emitted from the light source 100. The second photogate 322b of the second pixel 322 may output the generated phase signal to the phase pattern processor 600. As described above, the first photogate 322a and the second photogate 322b of the second pixel 322 may output the phase signals having a difference of 180 degrees.

The signal output device 410 may drive the first photogate 323a of the third pixel 323 to be synchronized with the initial phase of the light emitted from the light source 100 at 0 degrees among 0 degrees, 90 degrees, 180 degrees, and 270 degrees. To accomplish this, the signal output device 410 may supply the fifth photogate driving signal ⑤ for driving the first photogate 323a of the third pixel 323 to the first photogate 323a of the third pixel 323. Accordingly, the first photogate 323a of the third pixel 323 may be driven by the fifth photogate driving signal ⑤ input thereto, thereby generating a phase signal corresponding to the initial 0-degree phase of the light emitted from the light source 100. The first photogate 323a of the third pixel 323 may output the generated phase signal to the phase pattern processor 600. The signal output device 410 may drive the second photogate 323b of the third pixel 323 to be synchronized with the initial phase of the light emitted from the light source 100 at 180 degrees among 0 degrees, 90 degrees, 180 degrees, and 270 degrees. To accomplish this, the signal output device 410 may supply the sixth photogate driving signal ⑥ for driving the second photogate 323b of the third pixel 323 to the second photogate 323b of the third pixel 323. Accordingly, the second photogate 323b of the third pixel 323 may be driven by the sixth photogate driving signal ⑥ input thereto, thereby generating a phase signal corresponding to the initial 180-degree phase of the light emitted from the light source 100. The second photogate 323b of the third pixel 323 may output the generated phase signal to the phase pattern processor 600. As described above, the first photogate 323a and the second photogate 323b of the third pixel 323 may output the phase signals having a difference of 180 degrees.

The signal output device 410 may drive the first photogate 324a of the fourth pixel 324 to be synchronized with the initial phase of the light emitted from the light source 100 at 0 degrees among 0 degrees, 90 degrees, 180 degrees, and 270 degrees. To accomplish this, the signal output device 410 may supply the seventh photogate driving signal ⑦ for driving the first photogate 324a of the fourth pixel 324 to the first photogate 324a of the fourth pixel 324. Accordingly, the first photogate 324a of the fourth pixel 324 may be driven by the seventh photogate driving signal ⑦ input thereto, thereby generating a phase signal corresponding to the initial 0-degree phase of the light emitted from the light source 100. The first photogate 324a of the fourth pixel 324 may output the generated phase signal to the phase pattern processor 600. The signal output device 410 may drive the second photogate 324b of the fourth pixel 324 to be synchronized with the initial phase of the light emitted from the light source 100 at 180 degrees among 0 degrees, 90 degrees, 180 degrees, and 270 degrees. To accomplish this, the signal output device 410 may supply the eighth photogate driving signal ⑧ for driving the second photogate 324b of the fourth pixel 324 to the second photogate 324b of the fourth pixel 324. Accordingly, the second photogate 324b of the fourth pixel 324 may be driven by the eighth photogate driving signal ⑧ input thereto, thereby generating a phase signal corresponding to the initial 180-degree phase of the light emitted from the light source 100. The second photogate 324b of the fourth pixel 324 may output the generated phase signal to the phase pattern processor 600. As described above, the first photogate 324a and the second photogate 324b of the fourth pixel 324 may output the phase signals having a difference of 180 degrees.

The phase pattern processor 600 may generate respective digital phase values by converting the phase signals input from each of the plurality of photogates 321a, 321b, 322a, 322b, 323a, 323b, 324a, and 324b during one frame period from analog to digital. The phase pattern processor 600 may arrange the digital phase values on the basis of an input mode or a preset mode. As shown in FIG. 8, the phase pattern processor 600 may generate the phase pattern image 810 of one frame by selectively arranging digital phase values corresponding to the initial 0-degree, 90-degree, 180-degree, and 270-degree phases of the light emitted from the light source 100. In other words, the phase pattern processor 600 may generate the phase pattern image 810 by selectively arranging the 0-degree, 90-degree, 180-degree, and 270-degree phase signals in one frame.

The phase pattern image 810 of one frame shown in FIG. 8 may be generated in consideration of an X-axis resolution. When the 3D imaging device 1000 including a ToF sensor is applied to a system requiring a high resolution in the X-axis direction, the phase pattern processor 600 may apply the phase pattern image 810 shown in FIG. 8 on the basis of an input mode or a preset mode.

The phase pattern processor 600 may arrange digital phase values of 0 degrees and 180 degrees in even-numbered rows of the phase pattern image 810 of one frame and arrange digital phase values of 90 degrees and 270 degrees in odd-numbered rows. In the alternative, the phase pattern processor 600 may arrange digital phase values of 0 degrees and 180 degrees in odd-numbered rows of the phase pattern image 810 of one frame and arrange digital phase values of 90 degrees and 270 degrees in even-numbered rows. The phase pattern processor 600 may arrange digital phase values of 0 degrees and 270 degrees in even-numbered columns of the phase pattern image 810 of one frame and arrange digital phase values of 90 degrees and 180 degrees in odd-numbered columns of the phase pattern image 810 of one frame. In the alternative, the phase pattern processor 600 may arrange digital phase values of 0 degrees and 270 degrees in odd-numbered columns of the phase pattern image 810 of one frame and arrange digital phase values of 90 degrees and 180 degrees in even-numbered columns of the phase pattern image 810 of one frame. Although the whole frame is not shown in FIG. 8, the phase pattern image 810 may be generated in a form in which the phase pattern of the region A is repeatedly arranged.

Figure 11:
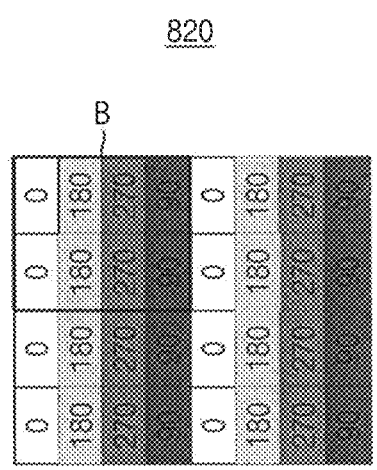
FIG. 11 is a diagram showing a phase pattern in which a Y-axis resolution is taken into consideration according to an exemplary embodiment of the present inventive concept.
Figure 12:
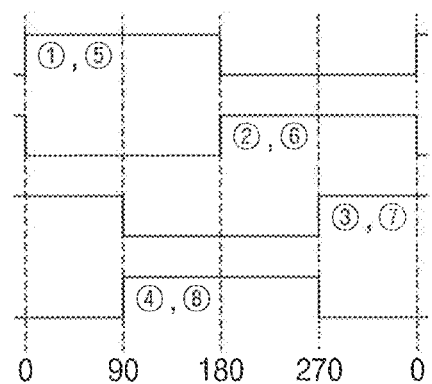
FIG. 12 is a timing diagram of control signals supplied from a sensor driver to respective pixels of a ToF sensor to generate the phase pattern of FIG. 11 according to an exemplary embodiment of the present inventive concept.

FIG. 11 is a diagram showing a phase pattern in which a Y-axis resolution is taken into consideration according to an exemplary embodiment of the present inventive concept. FIG. 12 is a timing diagram of control signals supplied from a sensor driver to respective pixels of a ToF sensor to generate the phase pattern of FIG. 11 according to an exemplary embodiment of the present inventive concept. Except for timings of photogate driving signals output from the sensor driver 400 and the arrangement of phase patterns, the exemplary embodiment of the present inventive concept shown in FIGS. 11 and 12 is substantial the same as the exemplary embodiment described with reference to FIGS. 8 to 10, and thus, the same descriptions may be omitted.

Referring to FIGS. 9, 11, and 12, the phase pattern processor 600 may arrange digital phase values of four phase signals (e.g., 0 degrees, 90 degrees, 180 degrees, and 270 degrees) in a phase pattern image 820 of one frame. The phase pattern processor 600 may generate the phase pattern image 820 of one frame in a form in which a phase pattern of a region B shown in FIG. 11 is repeated. To generate the phase pattern of the region B, the signal output device 410 of the sensor driver 400 may supply the sensor driving signal VD1 to each of the first pixel 321, the second pixel 322, the third pixel 323, and the fourth pixel 324. The sensor driving signal VD1 generated by the signal output device 410 may include the plurality of photogate driving signals ① to ⑧ for driving the first photogates 321a, 322a, 323a, and 324a and the second photogates 321b, 322b, 323b, and 324b included in the first pixel 321, the second pixel 322, the third pixel 323, and the fourth pixel 324. Accordingly, the first photogates 321a, 322a, 323a, and 324a and the second photogates 321b, 322b, 323b, and 324b included in the first pixel 321, the second pixel 322, the third pixel 323, and the fourth pixel 324 may be driven by the photogate driving signals ① to ⑧ input from the signal output device 410. Each of the first photogates 321a, 322a, 323a, and 324a and the second photogates 321b, 322b, 323b, and 324b may output a phase signal of any one of 0 degrees, 90 degrees, 180 degrees, and 270 degrees during one frame period.

For example, the signal output device 410 may supply the first photogate driving signal ① to the first photogate 321a of the first pixel 321 so that the first photogate 321a of the first pixel 321 may be driven in synchronization with the initial 0-degree phase of the light emitted from the light source 100. In addition, the signal output device 410 may supply the fifth photogate driving signal ⑤ to the first photogate 323a of the third pixel 323 so that the first photogate 323a of the third pixel 323 may be driven in synchronization with the initial 0-degree phase of the light emitted from the light source 100.

The signal output device 410 may supply the second photogate driving signal ② to the second photogate 321b of the first pixel 321 so that the second photogate 321b of the first pixel 321 may be driven in synchronization with the initial 180-degree phase of the light emitted from the light source 100. In addition, the signal output device 410 may supply the sixth photogate driving signal ⑥ to the second photogate 323b of the third pixel 323 so that the second photogate 323b of the third pixel 323 may be driven in synchronization with the initial 180-degree phase of the light emitted from the light source 100.

The signal output device 410 may supply the third photogate driving signal ③ to the first photogate 322a of the second pixel 322 so that the first photogate 322a of the second pixel 322 may be driven in synchronization with the initial 270-degree phase of the light emitted from the light source 100. In addition, the signal output device 410 may supply the seventh photogate driving signal ⑦ to the first photogate 324a of the fourth pixel 324 so that the first photogate 324a of the fourth pixel 324 may be driven in synchronization with the initial 270-degree phase of the light emitted from the light source 100.

The signal output device 410 may supply the fourth photogate driving signal ④ to the second photogate 322b of the second pixel 322 so that the second photogate 322b of the second pixel 322 may be driven in synchronization with the initial 90-degree phase of the light emitted from the light source 100. In addition, the signal output device 410 may supply the eighth photogate driving signal ⑧ to the second photogate 324b of the fourth pixel 324 so that the second photogate 324b of the fourth pixel 324 may be driven in synchronization with the initial 90-degree phase of the light emitted from the light source 100.

The first photogate 321a of the first pixel 321 and the first photogate 323a of the third pixel 323 may generate phase signals corresponding to the initial 0-degree phase of the light emitted from the light source 100, in response to the first and fifth photogate driving signals ①and ⑤. Accordingly, the first photogate 321a of the first pixel 321 and the first photogate 323a of the third pixel 323 may output the generated phase signals to the phase pattern processor 600.

The second photogate 322b of the second pixel 322 and the second photogate 324b of the fourth pixel 324 may generate phase signals corresponding to the initial 90-degree phase of the light emitted from the light source 100, in response to the fourth and eighth photogate driving signals ④ and ⑧. Accordingly, the second photogate 322b of the second pixel 322 and the second photogate 324b of the fourth pixel 324 may output the generated phase signals to the phase pattern processor 600.

The second photogate 321b of the first pixel 321 and the second photogate 323b of the third pixel 323 may generate phase signals corresponding to the initial 180-degree phase of the light emitted from the light source 100, in response to the second and sixth photogate driving signals ② and ⑥. Accordingly, the second photogate 321b of the first pixel 321 and the second photogate 323b of the third pixel 323 may output the generated phase signals to the phase pattern processor 600.

The first photogate 322a of the second pixel 322 and the first photogate 324a of the fourth pixel 324 may generate phase signals corresponding to the initial 270-degree phase of the light emitted from the light source 100, in response to the third and seventh photogate driving signals ③ and ⑦. Accordingly, the first photogate 322a of the second pixel 322 and the first photogate 324a of the fourth pixel 324 may output the generated phase signals to the phase pattern processor 600.

The phase pattern processor 600 may selectively arrange digital phase values on the basis of an input mode or a preset mode. As shown in FIG. 11, the phase pattern processor 600 may generate the phase pattern image 820 of one frame by arranging digital phase values corresponding to the initial 0-degree, 90-degree, 180-degree, and 270-degree phases of the light emitted from the light source 100. The phase pattern image 820 shown in FIG. 11 may be generated in consideration of a Y-axis resolution. When the 3D imaging device 1000 including a ToF sensor is applied to a system requiring a high resolution in the Y-axis direction, the phase pattern processor 600 may apply the phase pattern image 820 shown in FIG. 11 on the basis of an input mode or a preset mode.

The phase pattern processor 600 may arrange digital phase values of 0 degrees, 90 degrees, 180 degrees, and 270 degrees in all rows of the phase pattern image 820. The phase pattern processor 600 may arrange digital phase values of 0 degrees in a first column of the phase pattern image 820, arrange digital phase values of 180 degrees in a second column of the phase pattern image 820, arrange digital phase values of 270 degrees in a third column of the phase pattern image 820, and arrange digital phase values of 90 degrees in a fourth column of the phase pattern image 820. The phase pattern processor 600 may arrange a phase pattern of the first to fourth columns repeatedly. In other words, the phase pattern processor 600 may generate the phase pattern image 820 by selectively arranging 0-degree, 90-degree, 180-degree, and 270-degree phase signals in one frame. Although the whole frame is not shown in FIG. 11, the phase pattern image 820 may be generated in a form in which the phase pattern of the region B is repeatedly arranged.

Figure 13:
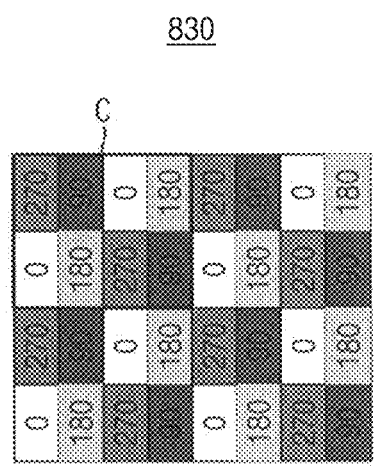
FIG. 13 is a diagram showing a phase pattern in which phases are disposed as a checkerboard pattern in consideration of X-axis and Y-axis resolutions according to an exemplary embodiment of the present inventive concept.
Figure 14:
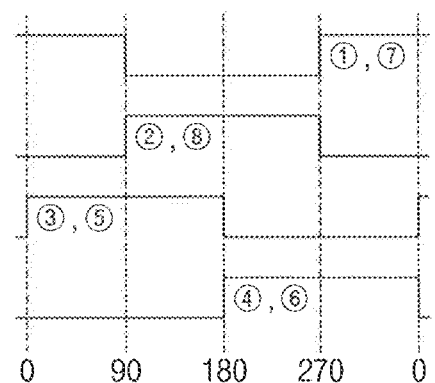
FIG. 14 is a timing diagram of control signals supplied from a sensor driver to respective pixels of a ToF sensor to generate the phase pattern of FIG. 13 according to an exemplary embodiment of the present inventive concept.

FIG. 13 is a diagram showing a phase pattern in which phases are disposed as a checkerboard pattern in consideration of X-axis and Y-axis resolutions according to an exemplary embodiment of the present inventive concept. FIG. 14 is a timing diagram of control signals supplied from a sensor driver to respective pixels of a ToF sensor to generate the phase pattern of FIG. 13 according to an exemplary embodiment of the present inventive concept.

Referring to FIGS. 9, 13, and 14, the phase pattern processor 600 may arrange digital phase values of four phase signals (e.g., 0 degrees, 90 degrees, 180 degrees, and 270 degrees) in a phase pattern image 830 of one frame. The phase pattern processor 600 may generate the phase pattern image 830 in a form in which a phase pattern of a region C shown in FIG. 13 is repeated.

To generate the phase pattern of the region C, the signal output device 410 of the sensor driver 400 may supply the sensor driving signal VD1 to each of the first pixel 321, the second pixel 322, the third pixel 323, and the fourth pixel 324. The sensor driving signal VD1 generated by the signal output device 410 may include the plurality of photogate driving signals ① to ⑧ for driving the first photogates 321a, 322a, 323a, and 324a and the second photogates 321b, 322b, 323b, and 324b included in the first pixel 321, the second pixel 322, the third pixel 323, and the fourth pixel 324. Accordingly, the first photogates 321a, 322a, 323a, and 324a and the second photogates 321b, 322b, 323b, and 324b included in the first pixel 321, the second pixel 322, the third pixel 323, and the fourth pixel 324 may be driven by the photogate driving signals ① to ⑧ which are input from the signal output device 410. Each of the first photogates 321a, 322a, 323a, and 324a and the second photogates 321b, 322b, 323b, and 324b may output a phase signal of any one of 0 degrees, 90 degrees, 180 degrees, and 270 degrees during one frame period.

For example, the signal output device 410 may supply the first photogate driving signal ① to the first photogate 321a of the first pixel 321 so that the first photogate 321a of the first pixel 321 may be driven in synchronization with the initial 270-degree phase of the light emitted from the light source 100. In addition, the signal output device 410 may supply the seventh photogate driving signal ⑦ to the first photogate 324a of the fourth pixel 324 so that the first photogate 324a of the fourth pixel 324 may be driven in synchronization with the initial 270-degree phase of the light emitted from the light source 100.

The signal output device 410 may supply the second photogate driving signal ② to the second photogate 321b of the first pixel 321 so that the second photogate 321b of the first pixel 321 may be driven in synchronization with the initial 90-degree phase of the light emitted from the light source 100. In addition, the signal output device 410 may supply the eighth photogate driving signal ⑧ to the second photogate 324b of the fourth pixel 324 so that the second photogate 324b of the fourth pixel 324 may be driven in synchronization with the initial 90-degree phase of the light emitted from the light source 100.

The signal output device 410 may supply the third photogate driving signal ③ to the first photogate 322a of the second pixel 322 so that the first photogate 322a of the second pixel 322 may be driven in synchronization with the initial 0-degree phase of the light emitted from the light source 100. In addition, the signal output device 410 may supply the fifth photogate driving signal ⑤ to the first photogate 323a of the third pixel 323 so that the first photogate 323a of the third pixel 323 may be driven in synchronization with the initial 0-degree phase of the light emitted from the light source 100.

The signal output device 410 may supply the fourth photogate driving signal ④ to the second photogate 322b of the second pixel 322 so that the second photogate 322b of the second pixel 322 may be driven in synchronization with the initial 180-degree phase of the light emitted from the light source 100. In addition, the signal output device 410 may supply the sixth photogate driving signal ⑥ to the second photogate 323b of the third pixel 323 so that the second photogate 323b of the third pixel 323 may be driven in synchronization with the initial 180-degree phase of the light emitted from the light source 100.

The first photogate 322a of the second pixel 322 and the first photogate 323a of the third pixel 323 may generate phase signals corresponding to the initial 0-degree phase of the light emitted from the light source 100, in response to the third and fifth photogate driving signals ③ and ⑤. Accordingly, the first photogate 322a of the second pixel 322 and the first photogate 323a of the third pixel 323 may output the generated phase signals to the phase pattern processor 600.

The second photogate 321b of the first pixel 321 and the second photogate 324b of the fourth pixel 324 may generate phase signals corresponding to the initial 90-degree phase of the light emitted from the light source 100, in response to the second and eighth photogate driving signals ② and ⑧. Accordingly, the second photogate 321b of the first pixel 321 and the second photogate 324b of the fourth pixel 324 may output the generated phase signals to the phase pattern processor 600.

The second photogate 322b of the second pixel 322 and the second photogate 323b of the third pixel 323 may generate phase signals corresponding to the initial 180-degree phase of the light emitted from the light source 100, in response to the fourth and sixth photogate driving signals ④ and ⑥. Accordingly, the second photogate 322b of the second pixel 322 and the second photogate 323b of the third pixel 323 may output the generated phase signals to the phase pattern processor 600.

The first photogate 321a of the first pixel 321 and the first photogate 324a of the fourth pixel 324 may generate phase signals corresponding to the initial 270-degree phase of the light emitted from the light source 100, in response to the first and seventh photogate driving signals ① and ⑦. Accordingly, the first photogate 321a of the first pixel 321 and the first photogate 324a of the fourth pixel 324 may output the generated phase signals to the phase pattern processor 600.

The phase pattern processor 600 may selectively arrange digital phase values on the basis of an input mode or a preset mode. As shown in FIG. 13, the phase pattern processor 600 may generate the phase pattern image 830 of one frame by arranging digital phase values corresponding to the initial 0-degree, 90-degree, 180-degree, and 270-degree phases of the light emitted from the light source 100. The phase pattern image 830 of one frame shown in FIG. 13 may be generated in consideration of X-axis and Y-axis resolutions. When the 3D imaging device 1000 including a ToF sensor is applied to a system requiring a certain resolution in the X-axis and Y-axis directions, the phase pattern processor 600 may apply the phase pattern image 830 shown in FIG. 13 on the basis of an input mode or a preset mode.

The phase pattern processor 600 may arrange digital phase values of 0 degrees, 90 degrees, 180 degrees, and 270 degrees in all rows of the phase pattern image 830 of one frame. In addition, the phase pattern processor 600 may arrange digital phase values of 0 degrees, 90 degrees, 180 degrees, and 270 degrees in all columns of the phase pattern image 830 of one frame. In other words, the phase pattern processor 600 may generate the phase pattern image 830 by selectively arranging 0-degree, 90-degree, 180-degree, and 270-degree phase signals in one frame. Although the whole frame is not shown in FIG. 13, the phase pattern image 830 may be generated in a form in which the phase pattern of the region C is repeatedly disposed.

The depth information generator 700 may generate depth information of an object, in other words, a depth map, on the basis of a phase pattern image of one frame input from the phase pattern processor 600. Here, the depth information of the object may be generated by applying Equation 1 or Equation 2 given below. The depth information generator 700 may generate the depth information of the object by using phase signals A0, A1, A2, and A3 sampled at four phase points (e.g., 0 degrees, 90 degrees, 180 degrees, and 270 degrees) as shown in FIGS. 4A and 4B. Here, the depth information generator 700 may generate the depth information of the object by applying Equation 1 or Equation 2 given below to the phase signals A0, A1, A2, and A3. When the phase signals A0, A1, A2, and A3 are sampled at the four phase points, a phase difference Φ may be calculated as shown in Equation 1 below.

$$\phi = \arctan\left(\frac{A_1 - A_3}{A_0 - A_2}\right) \quad \text{[Equation 1]}$$

As shown in Equation 1, it is possible to calculate the phase difference Φ between the light emitted from the light source 100 and light reflected by the object by using the phase signals A0, A1, A2, and A3 sampled at the four phase points.

A distance d from the object may be calculated as shown in Equation 2 below.

$$d = \frac{c}{2f_m} \frac{\phi}{2\pi} \quad \text{[Equation 2]}$$

In Equation 2, c denotes the speed of light, and $f_m$ denotes a modulation frequency. As described above, the depth information generator 700 may calculate the distance between the light source 100 and the object by using the phase difference, thereby acquiring depth information of the object.

Referring to the phase pattern of FIG. 8, it can be seen that phase signals in the horizontal direction are alternately omitted. When the phase pattern image 810 of FIG. 8 is received, the depth information generator 700 may estimate omitted phase signals through phase interpolation employing surrounding pixel signals. In this way, the depth information generator 700 may acquire depth information having a high resolution in the horizontal direction.

Referring to the phase pattern of FIG. 11, it can be seen that phase signals in the vertical direction are alternately omitted. When the phase pattern image 820 of FIG. 11 is received, the depth information generator 700 may estimate omitted phase signals through phase interpolation employing surrounding pixel signals. In this way, the depth information generator 700 may acquire depth information having a high resolution in the vertical direction.

Referring to the phase pattern of FIG. 13, 0-degree, 90-degree, 180-degree, and 270-degree phase signals are arranged not to adjoin the same kinds of phase signals in the horizontal direction and the vertical direction. When the phase pattern image 830 of FIG. 13 is received, the depth information generator 700 may acquire depth information having a certain level of resolution in the horizontal direction and the vertical direction. When the phase pattern of FIG. 13 is applied, horizontal and vertical resolutions may each be reduced by $\sqrt{2}$, but it is possible to obtain a certain level of resolution in both the horizontal and vertical directions. In other words, it is possible to obtain balanced resolutions in the horizontal and vertical directions.

With reference to FIGS. 8 to 14, it has been described that the phase pattern processor 600 generates a phase pattern image including the phase pattern shown in FIG. 8, 11, or 13. However, the present inventive concept is not limited thereto, and the phase pattern processor 600 may determine an applicable mode by analyzing an image which is captured in real time and generate a phase pattern image on the basis of the determined mode. The phase pattern processor 600 may output the generated phase pattern image to the depth information generator 700. As an example, when a high resolution is required in the horizontal direction, the phase pattern processor 600 may generate a phase pattern image including the phase pattern shown in FIG. 8. As an example, when a high resolution is required in the vertical direction, the phase pattern processor 600 may generate a phase pattern image including the phase pattern shown in FIG. 11. As an example, when a certain level of resolution is required in the horizontal and vertical directions, the phase pattern processor 600 may generate a phase pattern image including the phase pattern shown in FIG. 13. As an example, when a high resolution is required in the horizontal direction during a first frame period, the phase pattern processor 600 may generate the phase pattern image 810 shown in FIG. 8. Subsequently, when a high resolution is required in the vertical direction during a second frame period, the phase pattern processor 600 may generate the phase pattern image 820 shown in FIG. 11. Subsequently, when a certain level of resolution is required in the horizontal and vertical directions during a third frame period, the phase pattern processor 600 may generate the phase pattern image 830 shown in FIG. 13.

Figure 15A:
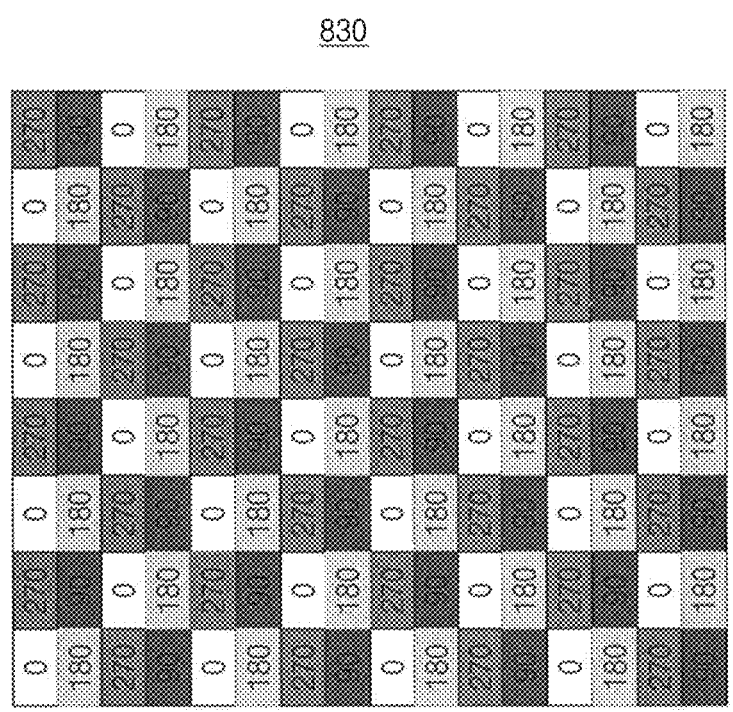
FIG. 15A is a diagram showing a phase pattern in which phase signals are disposed as a checkerboard pattern according to an exemplary embodiment of the present inventive concept.
Figure 15B:
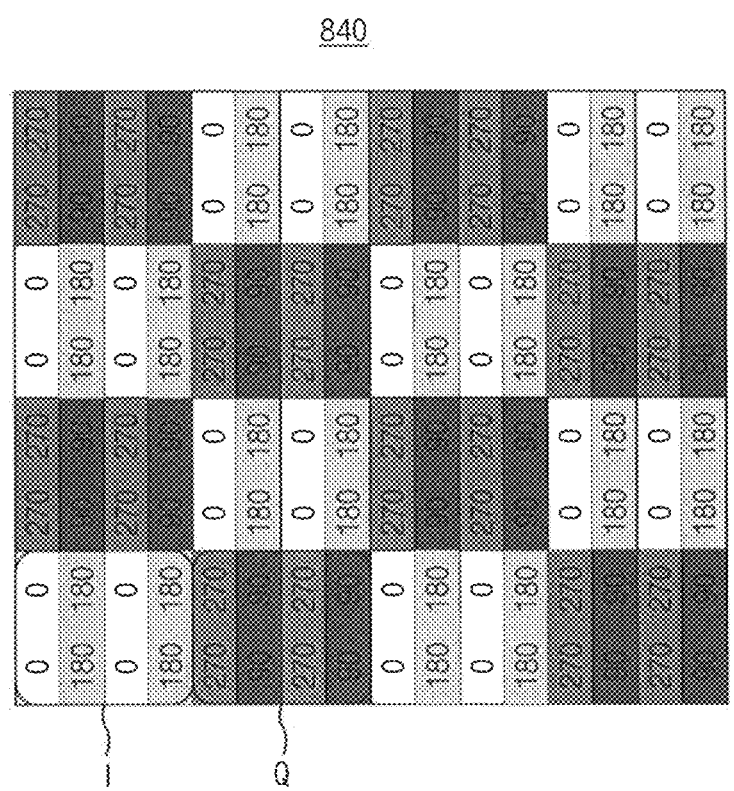
FIG. 15B is a diagram showing a phase pattern disposed by grouping a plurality of pixels in the checkerboard phase pattern of FIG. 15A using a 2×2 binning method according to an exemplary embodiment of the present inventive concept.

FIG. 15A is a diagram showing a phase pattern in which phase signals are disposed in a checkerboard pattern according to an exemplary embodiment of the present inventive concept. FIG. 15B is a diagram showing a phase pattern disposed by grouping a plurality of pixels in the checkerboard phase pattern of FIG. 15A using a 2×2 binning method according to an exemplary embodiment of the present inventive concept.

Referring to FIG. 15A, the phase pattern processor 600 may generate the phase pattern image 830 of one frame as a checkerboard pattern by arranging the digital phase values of the phase signals corresponding to the initial 0-degree, 90-degree, 180-degree, and 270-degree phase signals of the light emitted from the light source 100 not to adjoin the same kinds of phase signals. FIG. 15A shows that a total of four photogates included in two adjacent pixels output different phase signals (e.g., 0 degrees, 90 degrees, 180 degrees, and 270 degrees). The phase pattern processor 600 may receive phase signals output from the respective photogates and repeatedly dispose a phase pattern in which digital phase values of 0-degree, 90-degree, 180-degree, and 270-degree phase signals are arranged not to adjoin the same kinds of phase signals. In this way, the phase pattern processor 600 may generate the phase pattern image 830 of one frame including all of the 0-degree, 90-degree, 180-degree, and 270-degree phase signals.

Referring to FIG. 15B, in a phase pattern image 840, pixels are classified into pixel groups each including a certain number of pixels, and pixels included in a pixel group are made to output the same phase signal, such that the output size of a depth map may be reduced. Adjacent pixel groups may be made to output different phase signals. For example, pixels may be classified into pixel groups each including four pixels, and pixels in a pixel group may output the same phase signal. Here, first photogates of four pixels constituting one pixel group may output the same phase signal. In addition, second photogates of the four pixels constituting the pixel group may output the same phase signal. The first photogates and the second photogates may output phase signals having a phase difference of 180 degrees.

As an example, each of first photogates of four pixels included in a pixel group I may output a phase signal corresponding to the initial 0-degree phase of the light source 100. In addition, each of second photogates of the four pixels included in the pixel group I may output a phase signal corresponding to the initial 180-degree phase of the light source 100. In the pixel group I, the plurality of first photogates and the plurality of second photogates may output phase signals having a phase difference of 180 degrees.

Each of first photogates of four pixels included in a pixel group Q, which is adjacent to the pixel group I, may output a phase signal corresponding to the initial 270-degree phase of the light source 100. In addition, each of second photogates of the four pixels included in the pixel group Q may output a phase signal corresponding to the initial 90-degree phase of the light source 100. In the pixel group Q, the plurality of first photogates and the plurality of second photogates may output phase signals having a phase difference of 180 degrees.

Figure 16:
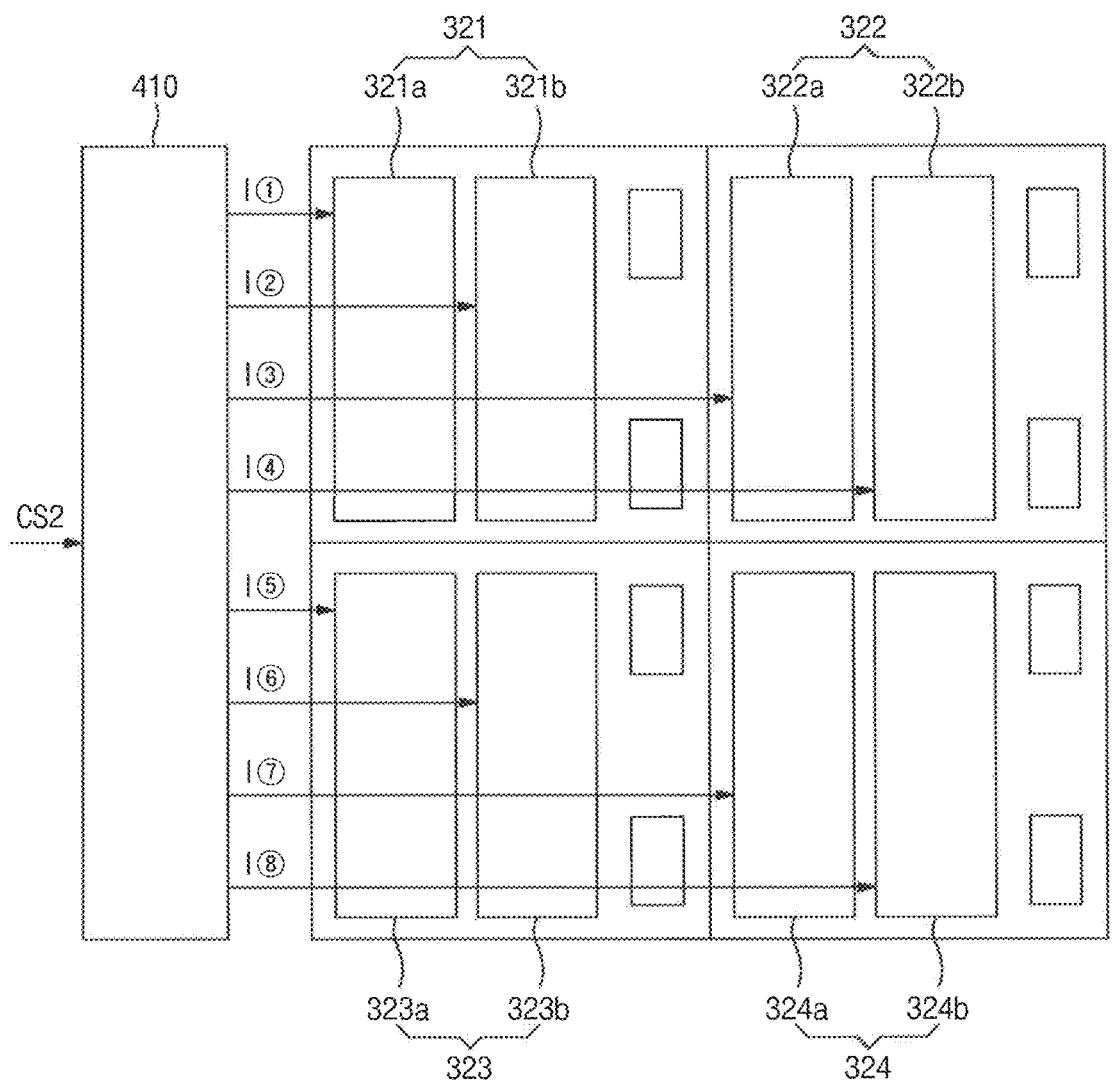
FIGS. 16 and 17 are diagrams illustrating a method of driving a sensor driver and a ToF sensor for generating phase patterns of a block I and a block Q in the phase pattern of FIG. 15B according to an exemplary embodiment of the present inventive concept.
Figure 17:
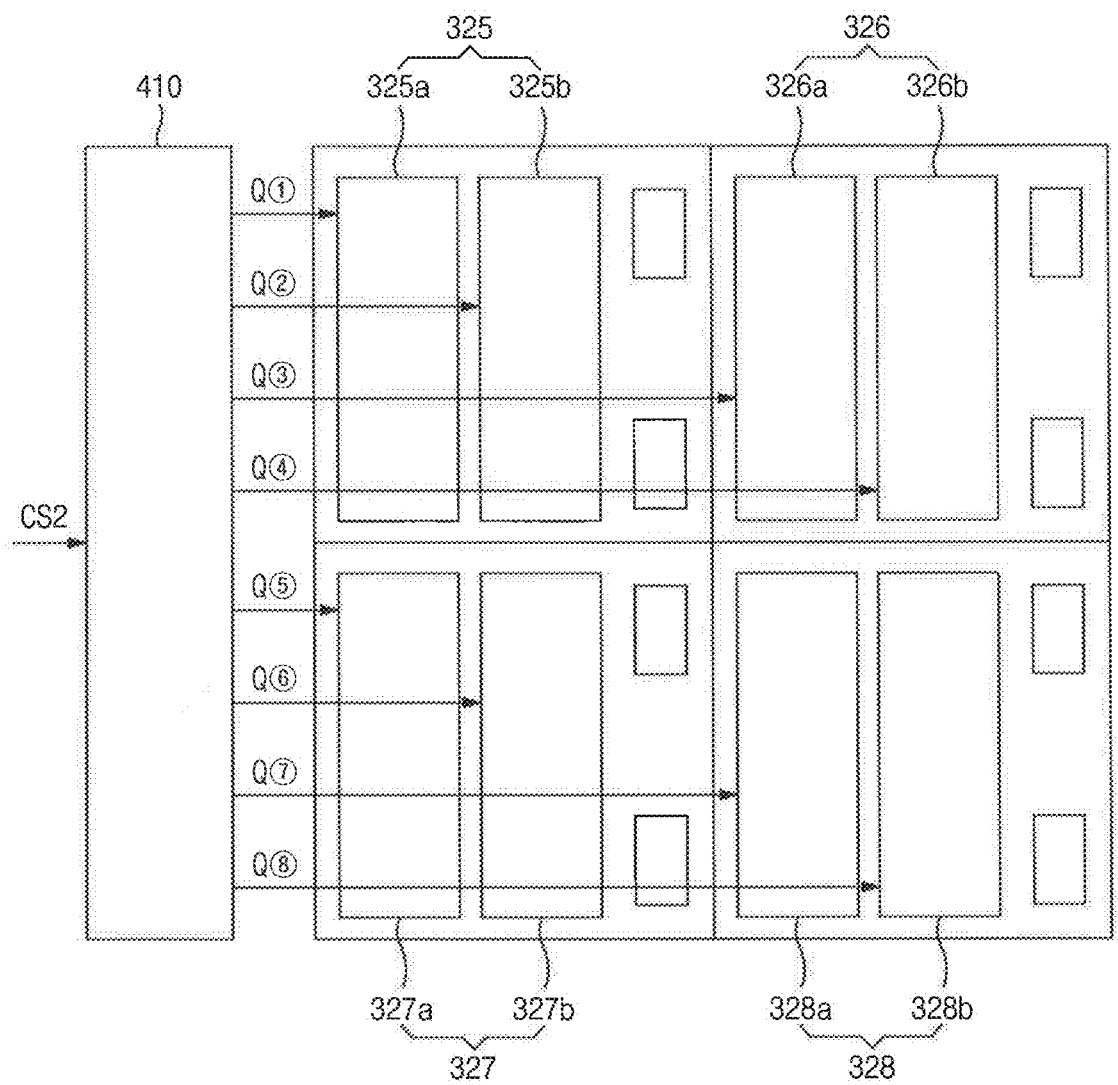
Figure 18:
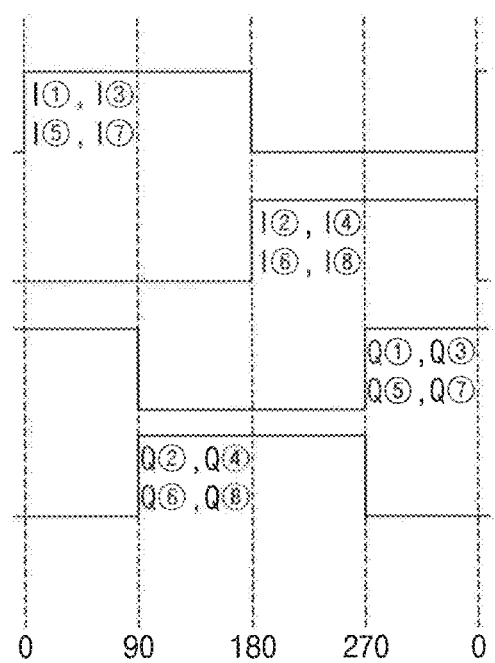
FIG. 18 is a timing diagram of control signals supplied from a sensor driver to respective pixels of a ToF sensor to generate the phase pattern of FIG. 15B according to an exemplary embodiment of the present inventive concept.

FIGS. 16 and 17 are diagrams illustrating a method of driving a sensor driver and a ToF sensor for generating phase patterns of a block I and a block Q in the phase pattern of FIG. 15B according to an exemplary embodiment of the present inventive concept. FIG. 18 is a timing diagram of control signals supplied from a sensor driver to respective pixels of a ToF sensor to generate the phase pattern of FIG. 15B according to an exemplary embodiment of the present inventive concept. FIG. 16 shows four pixels 321, 322, 323 and 324 included in the pixel group I, and FIG. 17 shows four pixels 325, 326, 327 and 328 included in the pixel group Q.

Referring to FIGS. 16 to 18, the sensor driving signal VD1 generated by a signal output device 410 may include a plurality of photogate driving signals I①  to I⑧ for driving first photogates 321a, 322a, 323a, and 324a and second photogates 321b, 322b, 323b, and 324b of the four pixels 321 to 324 included in the pixel group I. In addition, the sensor driving signal VD1 generated by the signal output device 410 may include a plurality of photogate driving signals Q① to Q⑧ for driving first photogates 325a, 326a, 327a, and 328a and second photogates 325b, 326b, 327b, and 328b of the four pixels 325 to 328 included in the pixel group Q.

First, the photogate driving signals I① to I⑧ supplied to the pixels 321, 322, 323, and 324 included in the pixel group I shown in FIG. 16 will be described. The signal output device 410 may supply the photogate driving signals I①, I③, I⑤, and I⑦ respectively to the first photogates 321a, 322a, 323a, and 324a of the first pixel 321, the second pixel 322, the third pixel 323, and the fourth pixel 324 included in the pixel group I so that the first photogates 321a, 322a, 323a, and 324a may be driven in synchronization with the initial 0-degree phase of the light emitted from the light source 100. In addition, the signal output device 410 may supply the photogate driving signals I②, I④, I⑥, and I⑧ respectively to the second photogates 321b, 322b, 323b, and 324b of the first pixel 321, the second pixel 322, the third pixel 323, and the fourth pixel 324 included in the pixel group I so that the second photogates 321b, 322b, 323b, and 324b may be driven in synchronization with the initial 180-degree phase of the light emitted from the light source 100.

The first photogates 321a, 322a, 323a, and 324a of the first pixel 321, the second pixel 322, the third pixel 323, and the fourth pixel 324 included in the pixel group I may generate phase signals corresponding to the initial 0-degree phase of the light emitted from the light source 100, in response to the photogate driving signals I①, I③, I⑤, and I⑦. Accordingly, the first photogates 321a, 322a, 323a, and 324a of the first pixel 321, the second pixel 322, the third pixel 323, and the fourth pixel 324 included in the pixel group I may output the generated phase signals to the phase pattern processor 600.

The second photogates 321b, 322b, 323b, and 324b of the first pixel 321, the second pixel 322, the third pixel 323, and the fourth pixel 324 included in the pixel group I may generate phase signals corresponding to the initial 180-degree phase of the light emitted from the light source 100, in response to the photogate driving signals I②, I④, I⑥, and I⑧. Accordingly, the second photogates 321b, 322b, 323b, and 324b of the first pixel 321, the second pixel 322, the third pixel 323, and the fourth pixel 324 included in the pixel group I may output the generated phase signals to the phase pattern processor 600.

Next, the photogate driving signals Q① to Q⑧ supplied to the pixels 325, 326, 327, and 328 included in the pixel group Q shown in FIG. 17 will be described. The signal output device 410 may supply the photogate driving signals Q①, Q③, Q⑤, and Q⑦ respectively to the first photogates 325a, 326a, 327a, and 328a of the first pixel 325, the second pixel 326, the third pixel 327, and the fourth pixel 328 included in the pixel group Q so that the first photogates 325a, 326a, 327a, and 328a may be driven in synchronization with the initial 270-degree phase of the light emitted from the light source 100. In addition, the signal output device 410 may supply the photogate driving signals Q②, Q④, Q⑥, and Q⑧ respectively to the second photogates 325b, 326b, 327b, and 328b of the first pixel 325, the second pixel 326, the third pixel 327, and the fourth pixel 328 included in the pixel group Q so that the second photogates 325b, 326b, 327b, and 328b may be driven in synchronization with the initial 90-degree phase of the light emitted from the light source 100.

The first photogates 325a, 326a, 327a, and 328a of the first pixel 325, the second pixel 326, the third pixel 327, and the fourth pixel 328 included in the pixel group Q may generate phase signals corresponding to the initial 270-degree phase of the light emitted from the light source 100, in response to the photogate driving signals Q①, Q③, Q⑤, and Q⑦. Accordingly, the first photogates 325a, 326a, 327a, and 328a of the first pixel 325, the second pixel 326, the third pixel 327, and the fourth pixel 328 included in the pixel group Q may output the generated phase signals to the phase pattern processor 600.

The second photogates 325b, 326b, 327b, and 328b of the first pixel 325, the second pixel 326, the third pixel 327, and the fourth pixel 328 included in the pixel group Q may generate phase signals corresponding to the initial 90-degree phase of the light emitted from the light source 100, in response to the photogate driving signals Q②, Q④, Q⑥, and Q⑧. Accordingly, the second photogates 325b, 326b, 327b, and 328b of the first pixel 325, the second pixel 326, the third pixel 327, and the fourth pixel 328 included in the pixel group Q may output the generated phase signals to the phase pattern processor 600.

The phase pattern processor 600 may arrange digital phase values on the basis of an input mode or a preset mode. As shown in FIG. 15B, the phase pattern processor 600 may generate the phase pattern image 840 of one frame by arranging digital phase values corresponding to the initial 0-degree, 90-degree, 180-degree, and 270-degree phases of the light emitted from the light source 100. The phase pattern image 840 of one frame shown in FIG. 15B may be generated in consideration of X-axis and Y-axis resolutions. When the 3D imaging device 1000 including a ToF sensor is applied to a system requiring a certain resolution in the X-axis and Y-axis directions, the phase pattern processor 600 may apply the phase pattern image 840 shown in FIG. 15B on the basis of an input mode or a preset mode.

FIGS. 19, 20, 21 and 22 are diagrams showing phase patterns arranged by grouping pixels into pixel pattern units each including 4×4 pixels according to an exemplary embodiment of the present inventive concept.

With regard to operation and driving signals of the ToF sensor 300, the sensor driver 400, and the phase pattern processor 600 for generating phase pattern images shown in FIGS. 19 to 22, refer to the descriptions of FIGS. 8 to 18. As shown in FIGS. 19 to 22, various phase pattern images may be generated by diversifying the arrangement of phase patterns of pixel groups I and pixel groups Q shown in FIG. 15B.

Figure 19:
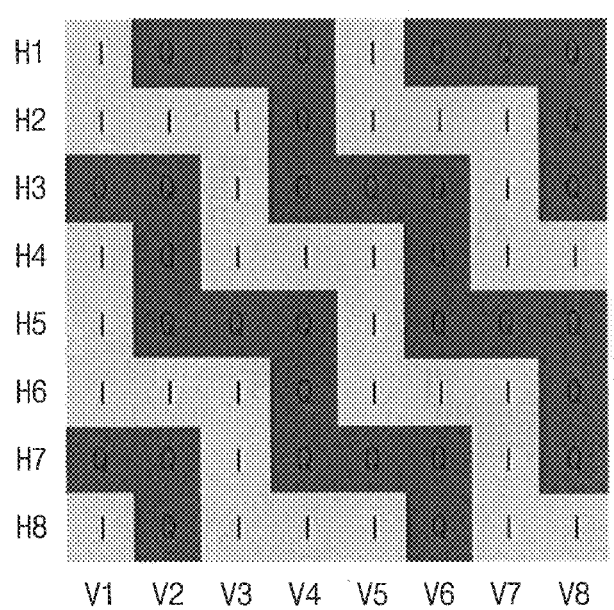
FIGS. 19, 20, 21 and 22 are diagrams showing phase patterns arranged by grouping pixels into unit pixel patterns each including 4×4 pixels according to an exemplary embodiment of the present inventive concept.

Referring to a phase pattern image 850 shown in FIG. 19, a plurality of pixel groups I and a plurality of pixel groups Q may be arranged in a 2D array. In a phase pattern image of one frame, an identical number of pixel groups I and pixel groups Q may be arranged in a stair shape. Some of the plurality of pixel groups I and some of the plurality of pixel groups Q may be disposed to adjoin each other in the horizontal and vertical directions. Some of the plurality of pixel groups I and some of the plurality of pixel groups Q may be disposed to adjoin each other in the horizontal direction and be spaced apart in the vertical direction. Some of the plurality of pixel groups I and some of the plurality of pixel groups Q may be disposed to adjoin each other in the vertical direction and be spaced apart in the horizontal direction.

The number of phase patterns of pixel groups Q disposed in odd-numbered rows H1, H3, H5, and H7 may be greater than that of phase patterns of pixel groups I disposed in the odd-numbered rows H1, H3, H5, and H7. As an example, in the odd-numbered rows H1, H3, H5, and H7, the number of phase patterns of pixel groups Q may be triple that of phase patterns of pixel groups I. In other words, in the odd-numbered rows H1, H3, H5, and H7, phase patterns of pixel groups I and phase patterns of pixel groups Q may have a ratio of 1:3. The ratio is not limited thereto, and phase patterns of pixel groups I and phase patterns of pixel groups Q in the odd-numbered rows H1, H3, H5, and H7 may have a ratio of 1:2, 1:4, 1:5, or 1:6. In addition, the number of phase patterns of pixel groups I disposed in even-numbered rows H2, H4, H6, and H8 may be greater than that of phase patterns of pixel groups Q disposed in the even-numbered rows H2, H4, H6, and H8. As an example, in the even-numbered rows H2, H4, H6, and H8, the number of phase patterns of pixel groups I may be triple that of phase patterns of pixel groups Q. In other words, in the even-numbered rows H2, H4, H6, and H8, phase patterns of pixel groups Q and phase patterns of pixel groups I may have a ratio of 1:3. The ratio is not limited thereto, and phase patterns of pixel groups Q and phase patterns of pixel groups I in the even-numbered rows H2, H4, H6, and H8 may have a ratio of 1:2, 1:4, 1:5, or 1:6.

The number of phase patterns of pixel groups I disposed in odd-numbered columns V1, V3, V5, and V7 may be greater than that of phase patterns of pixel groups Q disposed in the odd-numbered columns V1, V3, V5, and V7. As an example, in the odd-numbered columns V1, V3, V5, and V7, the number of phase patterns of pixel groups I may be triple that of phase patterns of pixel groups Q. In other words, in the odd-numbered columns V1, V3, V5, and V7, phase patterns of pixel groups Q and phase patterns of pixel groups I may have a ratio of 1:3. The ratio is not limited thereto, and phase patterns of pixel groups Q and phase patterns of pixel groups I in the odd-numbered columns V1, V3, V5, and V7 may have a ratio of 1:2, 1:4, 1:5, or 1:6. In addition, the number of phase patterns of pixel groups Q disposed in even-numbered columns V2, V4, V6, and V8 may be greater than that of phase patterns of pixel groups I disposed in the even-numbered columns V2, V4, V6, and V8. As an example, in the even-numbered columns V2, V4, V6, and V8, the number of phase patterns of pixel groups Q may be triple that of phase patterns of pixel groups I. In other words, in the even-numbered columns V2, V4, V6, and V8, phase patterns of pixel groups I and phase patterns of pixel groups Q may have a ratio of 1:3. The ratio is not limited thereto, and phase patterns of pixel groups I and phase patterns of pixel groups Q in the even-numbered columns V2, V4, V6, and V8 may have a ratio of 1:2, 1:4, 1:5, or 1:6. Here, phase patterns of pixel groups I may include phase signals corresponding to the initial 0-degree and 180-degree phases of the light emitted from the light source 100. Phase patterns of pixel groups Q may include phase signals corresponding to the initial 90-degree and 270-degree phases of the light emitted from the light source 100.

Figure 20:
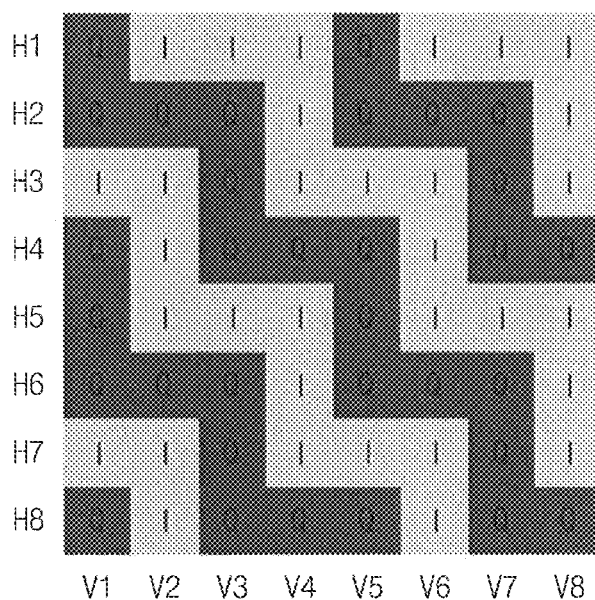

Referring to a phase pattern image 860 shown in FIG. 20, a plurality of pixel groups I and a plurality of pixel groups Q may be arranged in a 2D array. In a phase pattern image of one frame, an identical number of pixel groups I and pixel groups Q may be arranged in a stair shape. The number of phase patterns of pixel groups I disposed in odd-numbered rows H1, H3, H5, and H7 may be greater than that of phase patterns of pixel groups Q disposed in the odd-numbered rows H1, H3, H5, and H7. As an example, in the odd-numbered rows H1, H3, H5, and H7, the number of phase patterns of pixel groups I may be triple that of phase patterns of pixel groups Q. In other words, in the odd-numbered rows H1, H3, H5, and H7, phase patterns of pixel groups Q and phase patterns of pixel groups I may have a ratio of 1:3. The ratio is not limited thereto, and phase patterns of pixel groups Q and phase patterns of pixel groups I may have a ratio of 1:2, 1:4, 1:5, or 1:6. In addition, the number of phase patterns of pixel groups Q disposed in even-numbered rows H2, H4, H6, and H8 may be greater than that of phase patterns of pixel groups I disposed in the even-numbered rows H2, H4, H6, and H8. As an example, in the even-numbered rows H2, H4, H6, and H8, the number of phase patterns of pixel groups Q may be triple that of phase patterns of pixel groups I. In other words, in the even-numbered rows H2, H4, H6, and H8, phase patterns of pixel groups I and phase patterns of pixel groups Q may have a ratio of 1:3. The ratio is not limited thereto, and phase patterns of pixel groups I and phase patterns of pixel groups Q may have a ratio of 1:2, 1:4, 1:5, or 1:6.

The number of phase patterns of pixel groups Q disposed in odd-numbered columns V1, V3, V5, and V7 may be greater than that of phase patterns of pixel groups I disposed in the odd-numbered columns V1, V3, V5, and V7. As an example, in the odd-numbered columns V1, V3, V5, and V7, the number of phase patterns of pixel groups Q may be triple that of phase patterns of pixel groups I. In other words, in the odd-numbered columns V1, V3, V5, and V7, phase patterns of pixel groups I and phase patterns of pixel groups Q may have a ratio of 1:3. The ratio is not limited thereto, and phase patterns of pixel groups I and phase patterns of pixel groups Q may have a ratio of 1:2, 1:4, 1:5, or 1:6. In addition, the number of phase patterns of pixel groups I disposed in even-numbered columns V2, V4, V6, and V8 may be greater than that of phase patterns of pixel groups Q disposed in the even-numbered columns V2, V4, V6, and V8.

As an example, in the even-numbered columns V2, V4, V6, and V8, the number of phase patterns of pixel groups I may be triple that of phase patterns of pixel groups Q. In other words, in the even-numbered columns V2, V4, V6, and V8, phase patterns of pixel groups Q and phase patterns of pixel groups I may have a ratio of 1:3. The ratio is not limited thereto, and phase patterns of pixel groups Q and phase patterns of pixel groups I may have a ratio of 1:2, 1:4, 1:5, or 1:6. Here, phase patterns of pixel groups I may include phase signals corresponding to the initial 0-degree and 180-degree phases of the light emitted from the light source 100. Phase patterns of pixel groups Q may include phase signals corresponding to the initial 90-degree and 270-degree phases of the light emitted from the light source 100. The phase pattern image 860 shown in FIG. 20 may be obtained by putting pixel groups I in positions of pixel groups Q in the phase pattern image 850 shown in FIG. 19 and putting pixel groups Q in positions of pixel groups I in the phase pattern image 850 shown in FIG. 19.

Figure 21:
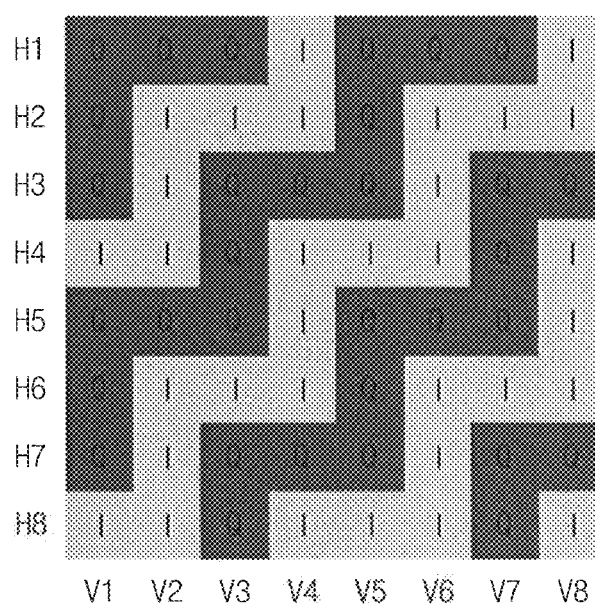

Referring to a phase pattern image 870 shown in FIG. 21, phase patterns of pixel groups I and pixel groups Q may be arranged according to the same rules as described with reference to FIG. 19. In each row and column, the numbers of phase patterns of pixel groups I and phase patterns of pixel groups Q and a ratio thereof may be the same as those described with reference to FIG. 19. The phase pattern image 870 shown in FIG. 21 may be obtained by reversing the phase pattern image 850 shown in FIG. 19 (e.g., left to right or vice versa).

Figure 22:
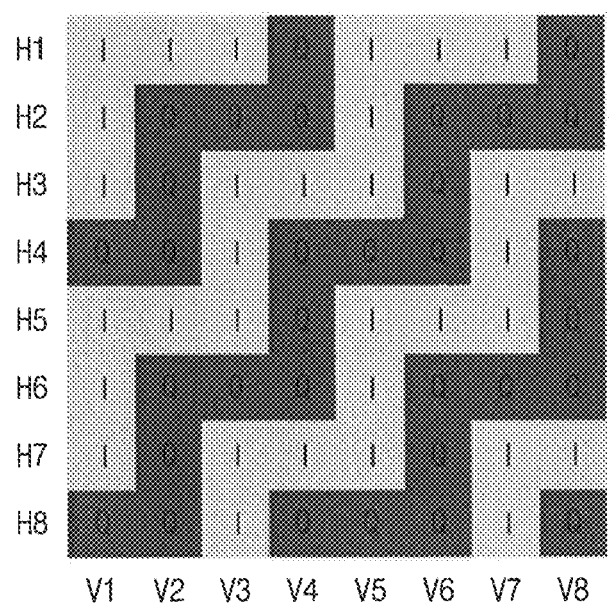

Referring to a phase pattern image 880 shown in FIG. 22, phase patterns of pixel groups I and pixel groups Q may be arranged according to the same rule as described with reference to FIG. 20. In each row and column, the numbers of phase patterns of pixel groups I and phase patterns of pixel groups Q and a ratio thereof may be the same as those described with reference to FIG. 20. The phase pattern image 880 shown in FIG. 22 may be obtained by exchanging the phase patterns of pixel groups I and the phase patterns of pixel groups Q shown in FIG. 21.

In FIGS. 19 to 22, different numbers of pixel groups I and pixel groups Q may be disposed in each row and column, but an identical number of pixel groups I and pixel groups Q are present in each phase pattern image. Such a pixel group arrangement makes it possible to uniformly maintain a 3D resolution even when the present inventive concept is combined with a dual-exposure method for dynamic range extension.

Figure 23A:
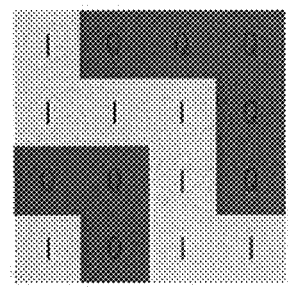
FIGS. 23A, 23B and 23C are diagrams showing phase patterns disposed to acquire depth information of an object located at a short distance and an object located at a long distance according to an exemplary embodiment of the present inventive concept.
Figure 23B:
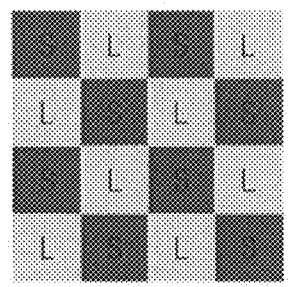
Figure 23C:
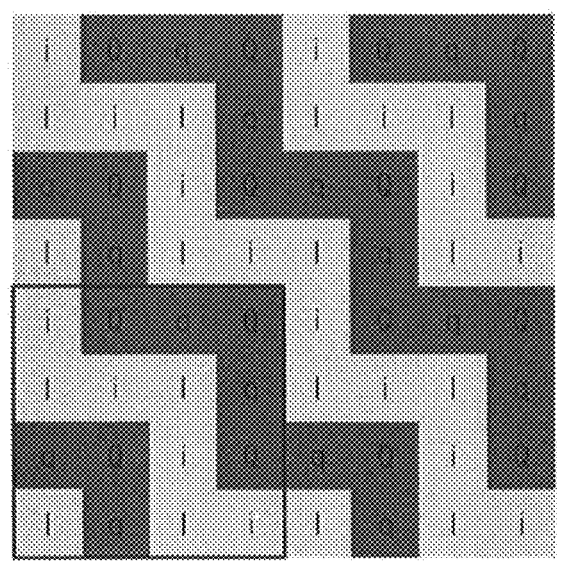
Figure 24:
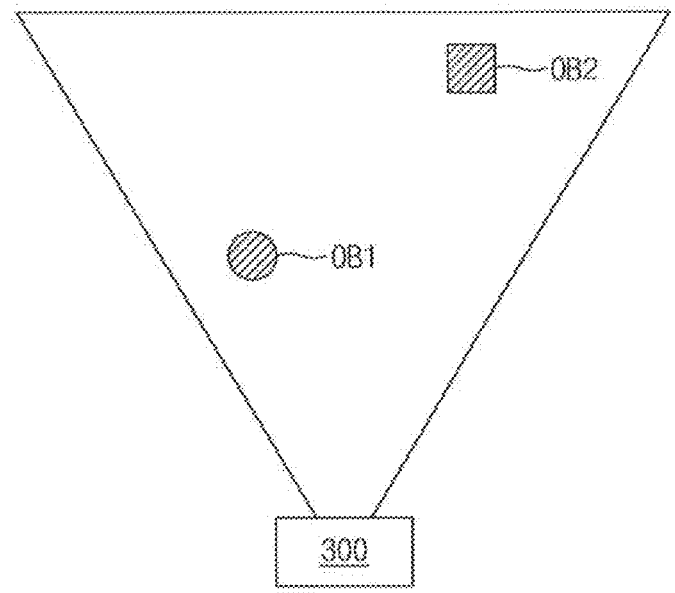
FIG. 24 is a diagram illustrating a method of acquiring depth information of an object located at a short distance and an object located at a long distance according to an exemplary embodiment of the present inventive concept.

FIGS. 23A, 23B and 23C are diagrams showing phase patterns disposed to acquire depth information of an object located at a short distance and an object located at a long distance according to an exemplary embodiment of the present inventive concept. FIG. 24 is a diagram illustrating a method of acquiring depth information of an object located at a short distance and an object located at a long distance according to an exemplary embodiment of the present inventive concept.

Referring to FIGS. 23A to 24, a hybrid phase pattern of FIG. 23C may be generated by combining the checkerboard phase pattern shown in FIG. 23A and the dual-exposure phase pattern of FIG. 23B. FIG. 23B shows an example of a dual-exposure phase pattern for dynamic range extension. In FIG. 23C, pixel groups I denote long-exposed in-phase pixels. Pixel groups i denote short-exposed in-phase pixels. Pixel groups Q denote long-exposed quadrature-phase pixels. Pixel groups q denote short-exposed quadrature-phase pixels.

As shown in FIG. 24, pixels which receive light reflected by a first object OB1 located at a short distance from the ToF sensor 300 may be saturated with received light within a relatively short time. On the other hand, pixels which receive light reflected by a second object OB2 located at a long distance from the ToF sensor 300 may be saturated with received light after a relatively long time. In this case, if driving time periods of all pixels are set to be identical, all of the pixels may be saturated with light received from the first object OB1 or the second object OB2. In this case, a distance difference between the first object OB1 and the second object OB2 may become unclear. However, in accordance with an exemplary embodiment of the present inventive concept, it is possible to adjust a driving time period in which each pixel 310 accumulates received light. As an example, a driving time period of each pixel 310 may be adjusted so that the distance difference between the first object OB1 located at the short distance from the ToF sensor 300 and the second object OB2 located at the long distance than the first object OB1 may become clear.

For example, as shown in FIG. 23B, all of the pixels 310 may be classified into a plurality of first pixel groups and second pixel groups. Driving time periods of pixels constituting the first pixel groups (e.g., the pixel groups I and the pixel groups Q) may be set to a first time period. Driving time periods of pixels constituting the second pixel groups (e.g., the pixel groups i and the pixel groups q) may be set to a second time period which is shorter than the first time period. In other words, the pixels of the first pixel groups (e.g., the pixel groups I and the pixel groups Q) may have a relatively long driving time period for receiving and accumulating light. The pixels of the second pixel groups (e.g., the pixel groups i and the pixel groups q) may have a relatively short driving time period for receiving and accumulating light. Here, the driving time period of the pixels constituting the first pixel groups may be made double to decouple the driving time period of the pixels constituting the second pixel groups. In other words, the driving time period of the pixels constituting the second pixel groups may be made half to one tenth the driving time period of the pixels constituting the first pixel groups.

It is possible to extend a dynamic range by separately controlling accumulation time periods of respective pixels with a mosaic pattern shown in FIG. 23B according to a long time L and a short time S. Here, when the checkerboard mosaic pattern of FIG. 23B is combined with the phase pattern of FIG. 13, the pixel groups I have a long accumulation time period, and the pixel groups Q have a short accumulation time period, such that the resolution may be degraded. Therefore, when the phase pattern of FIG. 23A and the dual-exposure phase pattern of FIG. 23B are combined as shown in FIG. 23C, it is possible to generate a depth map from image data of one frame and extend a dynamic range while uniformly maintaining the resolution.

The pixel groups Q are composed of a plurality of first pixels which are disposed adjacent to each other, and the plurality of first pixels may be driven for a first time period to output a first phase signal and a second phase signal which are different from each other. The pixel groups I are composed of a plurality of second pixels which are disposed adjacent to each other, and the plurality of second pixels may be driven for the first time period to output a third phase signal and a fourth phase signal which are different from each other. The pixel groups q are composed of a plurality of third pixels which are disposed adjacent to each other, and the plurality of third pixels may be driven for a second time period, which is shorter than the first time period, to output a fifth phase signal and a sixth phase signal different from each other. The pixel groups i are composed of a plurality of fourth pixels which are disposed adjacent to each other, and the plurality of fourth pixels may be driven for the second time period, which is shorter than the first time period, to output a seventh phase signal and an eighth phase signal different from each other. During one frame period, the first to eighth phase signals may be output.

Here, each of the plurality of first pixels may include a first photogate which accumulates received light for the first time period and outputs the first phase signal and a second photogate which accumulates received light for the first time period and outputs the second phase signal having a phase difference of 180 degrees with respect to the first phase signal. Each of the plurality of second pixels may include a third photogate which accumulates received light for the first time period and outputs the third phase signal and a fourth photogate which accumulates received light for the first time period and outputs the fourth phase signal having a phase difference of 180 degrees with respect to the third phase signal. Each of the plurality of third pixels may include a fifth photogate which accumulates received light for the second time period, which is shorter than the first time period, and outputs the fifth phase signal and a sixth photogate which accumulates received light for the second time period and outputs the sixth phase signal having a phase difference of 180 degrees with respect to the fifth phase signal. Each of the plurality of fourth pixels may include a seventh photogate which accumulates received light for the second time period, which is shorter than the first time period, and outputs the seventh phase signal and an eighth photogate which accumulates received light for the second time period and outputs the eighth phase signal having a phase difference of 180 degrees with respect to the seventh phase signal. Here, the first phase signal and the third phase signal have a phase difference of 90 degrees, the second phase signal and the fourth phase signal have a phase difference of 90 degrees, the fifth phase signal and the seventh phase signal have a phase difference of 90 degrees, and the sixth phase signal and the eighth phase signal have a phase difference of 90 degrees.

It is possible to calculate the distance of the first object OB1 located at the short distance from the ToF sensor 300 by using phase signals generated from the pixel groups i and the pixel groups q. It is possible to calculate the distance of the second object OB2 located at the long distance from the ToF sensor 300 by using phase signals generated from the pixel groups I and the pixel groups Q.

The present inventive concept is not limited thereto, and it is possible to adjust driving time periods in which pixels accumulate received light according to ambient illumination of the ToF sensor 300. For example, when driving time periods of all pixels are set to be identical, the accuracy in calculating the distance from an object may be degraded in a dark environment under low ambient illumination (e.g., at night with a small amount of light). In addition, the accuracy in calculating the distance from an object may be degraded in a bright environment under high ambient illumination (e.g., in the daytime with a large amount of light). However, in accordance with an exemplary embodiment of the present inventive concept, it is possible to adjust a driving time period in which each pixel 310 accumulates received light. As an example, driving time periods of pixels constituting the first pixel groups (e.g., the pixel groups I and the pixel groups Q) may be set to the first time period. Driving time periods of pixels constituting the second pixel groups (e.g., the pixel groups i and the pixel groups q) may be set to the second time period which is shorter than the first time period.

To calculate the distance from an object in a dark environment under low illumination, pixels constituting the pixel groups I and the pixel groups Q may be driven for the first time period and accumulate received light for the relatively long time period. Each of the pixels constituting the pixel groups I and the pixel groups Q may accumulate received light and output a phase signal. The phase pattern processor 600 may arrange phase signals of the pixel groups I and the pixel groups Q in a phase pattern image of one frame. To calculate the distance from an object in a bright environment under high illumination, pixels constituting the pixel groups i and the pixel groups q may be driven for the second time period and accumulate received light for the relatively short time period. Each of the pixels constituting the pixel groups i and the pixel groups q may accumulate received light and output a phase signal. The phase pattern processor 600 may dispose phase signals of the pixel groups i and the pixel groups q in a phase pattern image of one frame.

When a phase pattern image is generated as shown in FIG. 23C, it is possible to generate a depth map from image data of one frame and extend a dynamic range while uniformly maintaining the resolution. In a bright environment under high illumination, it is possible to calculate the distance from an object by using phase signals generated from the pixel groups i and the pixel groups q. In a dark environment under low illumination, it is possible to calculate the distance from an object by using phase signals generated from the pixel groups I and the pixel groups Q.

It has been described above that driving time periods of pixels are adjusted to be the first time period (e.g., long) and the second time period (e.g., short) in units of pixel groups to measure distances from an object at a long distance and an object at a short distance and measure distances from objects in a dark environment under low illumination and a bright environment under high illumination. Without being limited thereto, driving time periods may be adjusted to be the first time period (long) or the second time period (short) in units of pixels.

Figure 25A:
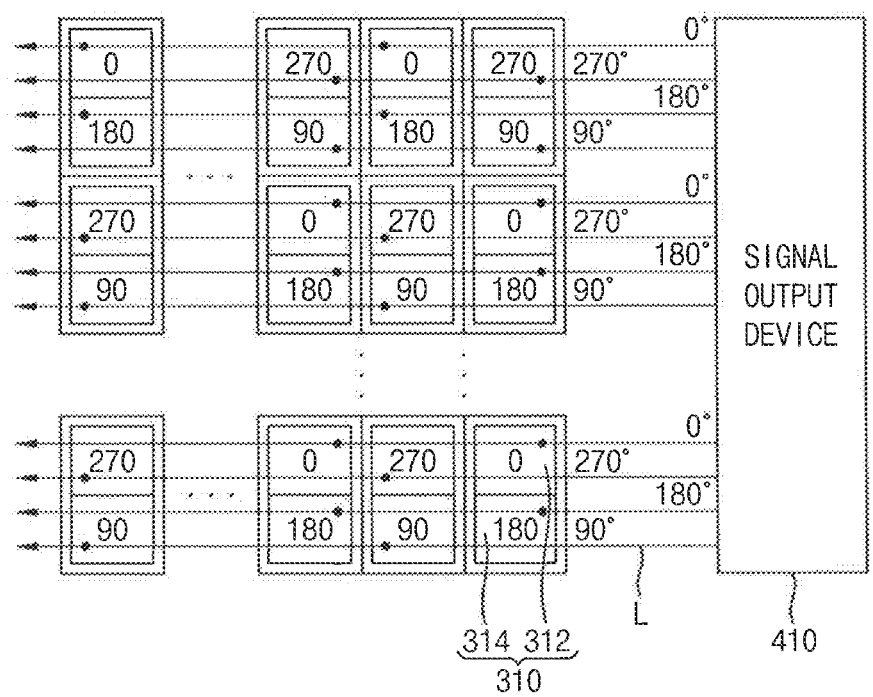
FIGS. 25A and 25B are diagrams showing arrangements of a signal output device and wires for supplying photogate driving signals to pixels according to an exemplary embodiment of the present inventive concept.
Figure 25B:
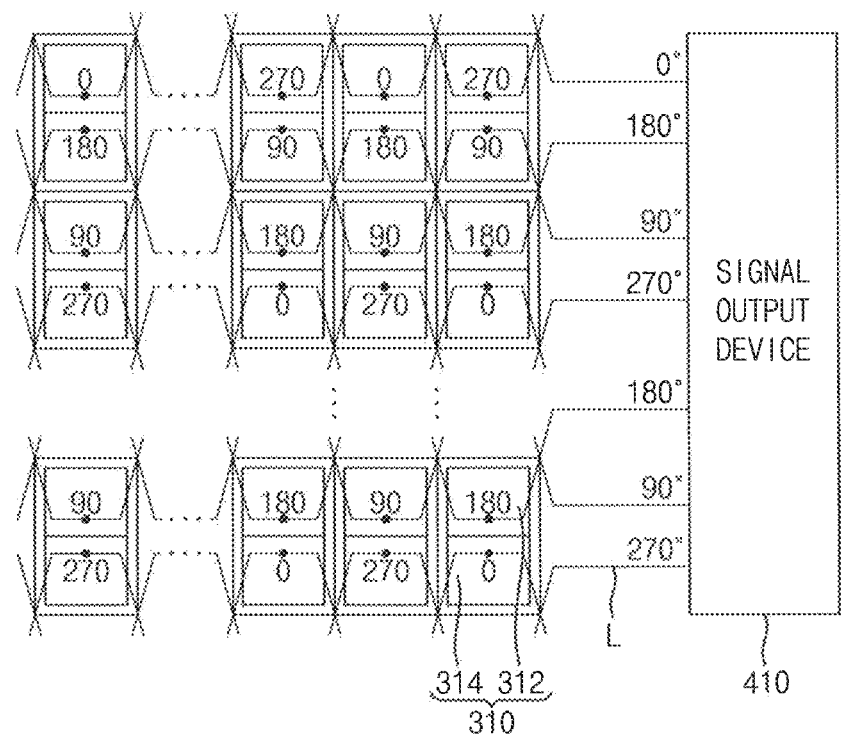

FIGS. 25A and 25B are diagrams showing arrangements of a signal output device and wires for supplying photogate driving signals to pixels according to an exemplary embodiment of the present inventive concept.

Referring to FIGS. 13 and 25A, a signal output channel of a signal output device 410 and each pixel 310 may be connected through a wire L to generate the checkerboard phase pattern image 830 shown in FIG. 13. Photogate driving signals output from respective signal output channels may be input to first photogates 312 and second photogates 314 of respective pixels 310 through wires L. The wires L may be arranged in a stripe pattern, and photogates which output the same phase signal may be connected to the same wire L. Two wires L may be disposed in each photogate row. In other words, twice as many wires L as there are photogates disposed in the vertical direction may be disposed to connect the ToF sensor 300 and the signal output device 410. The signal output device 410 may generate photogate driving signals for outputting 0-degree, 90-degree, 180-degree, and 270-degree phase signals and output the generated photogate driving signals through respective channels.

As an example, to arrange 0-degree, 90-degree, 180-degree, and 270-degree phase patterns as a checkerboard pattern in a phase pattern image of one frame, a photogate driving signal for outputting a 0-degree or 270-degree phase signal may be input to a first photogate 312 (e.g., an upper one of two tabs) of each pixel 310. A photogate driving signal for outputting a 90-degree or 180-degree phase signal may be input to a second photogate 314 (e.g., a lower one of two tabs) of each pixel 310. A first photogate 312 (e.g., an upper one of two tabs) of each pixel 310 may be driven by an input photogate driving signal and output a 0-degree or 270-degree phase signal. A second photogate 314 (e.g., a lower one of two tabs) of each pixel 310 may be driven by an input photogate driving signal and output a 90-degree or 180-degree phase signal.

Referring to FIGS. 13 and 25B, a signal output channel of a signal output device 410 and each pixel 310 may be connected through a wire L to generate the checkerboard phase pattern image 830 shown in FIG. 13. Photogate driving signals output from respective signal output channels may be input to first photogates 312 and second photogates 314 of respective pixels 310 through wires L. Two neighboring wires L may be arranged to cross each other, and photogates which output the same phase signal may be connected to the same wire L. One wire L may be disposed in one photogate row. In other words, wires L which have the same number as photogates disposed in the vertical direction may be disposed to connect the ToF sensor 300 and the signal output device 410. The signal output device 410 may generate photogate driving signals for outputting 0-degree, 90-degree, 180-degree, and 270-degree phase signals and output the generated photogate driving signals through respective channels. When the size of each pixel 310 is reduced, the circuit layout of the signal output device 410 may be complicated. To reduce the complexity of the circuit layout of the signal output device 410, the wires L may be disposed as shown in FIG. 25B. In this way, the number of wires L required to generate a checkerboard phase pattern is reduced such that the circuit layout of the signal output device 410 may be simplified.

As an example, to arrange 0-degree, 90-degree, 180-degree, and 270-degree phase patterns as a checkerboard pattern in a phase pattern image of one frame, a photogate driving signal for outputting a 0-degree or 270-degree phase signal may be input to a first photogate 312 (e.g., an upper one of two tabs) of each pixel 310. A photogate driving signal for outputting a 90-degree or 180-degree phase signal may be input to a second photogate 314 (e.g., a lower one of two tabs) of each pixel 310. A first photogate 312 (e.g., an upper one of two tabs) of each pixel 310 may be driven by an input photogate driving signal and output a 0-degree or 270-degree phase signal. A second photogate 314 (e.g., a lower one of two tabs) of each pixel 310 may be driven by an input photogate driving signal and output a 90-degree or 180-degree phase signal.

According to the exemplary embodiments of the present inventive concept, there is provided a ToF sensor, a 3D imaging device employing the ToF sensor, and a method of driving a 3D imaging device for preventing the occurrence of a motion artifact by acquiring depth information from image data of one frame.

According to the exemplary embodiments of the present inventive concept, there is provided a 3D imaging device for reducing memory required to acquire depth information of an object by acquiring depth information from image data of one frame.

While the present inventive concept has been particularly shown and described with reference to exemplary embodiments thereof, those of ordinary skill in the art would appreciate that the present inventive concept may be implemented in other forms without departing from the spirit and scope of the present inventive concept as defined by the following claims.

What is claimed is:

1. A three-dimensional (3D) imaging device, comprising:
a time of flight (ToF) sensor including:
a first pixel including a first photogate configured to receive light reflected by an object and generate a first phase signal, and a second photogate configured to generate a second phase signal having a phase difference of 180 degrees with respect to the first phase signal;
a second pixel including a third photogate configured to receive the light reflected by the object and generate a third phase signal different from the first phase signal and a fourth photogate configured to generate a fourth phase signal having a phase difference of 180 degrees with respect to the third phase signal;
a first signal output unit configured to output the first phase signal and the second phase signal; and
a second signal output unit configured to output the third phase signal and the fourth phase signal,
wherein the first, second, third and fourth photogates output the first, second, third and fourth phase signals during a frame period; and
a phase pattern processor configured to receive and convert the first phase signal, the second phase signal, the third phase signal, and the fourth phase signal into digital phase values and generate a phase pattern image by arranging the digital phase values in one frame.

2. The 3D imaging device of claim 1, wherein the first photogate outputs the first phase signal corresponding to one of initial 0-degree, 90-degree, 180-degree, and 270-degree phases of light emitted from a light source, and
the first phase signal and the third phase signal have a phase difference of 90 degrees.

3. The 3D imaging device of claim 1, wherein the second photogate outputs the second phase signal corresponding to one of initial 0-degree, 90-degree, 180-degree, and 270-degree phases of light emitted from a light source, and
the second phase signal and the fourth phase signal have a phase difference of 90 degrees.

4. The 3D imaging device of claim 1, wherein the third photogate outputs the third phase signal corresponding to one of initial 0-degree, 90-degree, 180-degree, and 270-degree phases of light emitted from a light source, and
the third phase signal and the second phase signal have a phase difference of 90 degrees.

5. The 3D imaging device of claim 1, wherein the fourth photogate outputs the fourth phase signal corresponding to one of initial 0-degree, 90-degree, 180-degree, and 270-degree phases of light emitted from a light source, and
the fourth phase signal and the first phase signal have a phase difference of 90 degrees.

6. A three-dimensional 3D imaging device, comprising:
a time of flight (ToF) sensor including:
first pixel groups including a plurality of pixels disposed adjacent to each other; and
second pixel groups including a plurality of pixels disposed adjacent to each other,
wherein each of the plurality of pixels of the first pixel groups receives light reflected by an object and outputs a first phase signal and a second phase signal having a phase difference of 180 degrees, and
each of the plurality of pixels of the second pixel groups receives the light reflected by the object and outputs a third phase signal and a fourth phase signal having a phase difference of 180 degrees; and
a phase pattern processor configured to receive and convert the first phase signal, the second phase signal, the third phase signal, and the fourth phase signal into digital phase values and generate a phase pattern image by arranging the digital phase values in one frame.

7. The 3D imaging device of claim 6, wherein the first phase signal, the second phase signal, the third phase signal, and the fourth phase signal are output during a frame period.

8. The 3D imaging device of claim 7, wherein each of the plurality of pixels of the first pixel groups includes a first photogate configured to output the first phase signal and a second photogate configured to output the second phase signal, and
each of the plurality of pixels of the second pixel groups includes a third photogate configured to output the third phase signal and a fourth photogate configured to output the fourth phase signal.

9. The 3D imaging device of claim 8, wherein the first phase signal output from the first photogate and the third phase signal output from the third photogate have a phase difference of 90 degrees.

10. The 3D imaging device of claim 8, wherein the second phase signal output from the second photogate and the fourth phase signal output from the fourth photogate have a phase difference of 90 degrees.

11. The 3D imaging device of claim 6, wherein the first pixel groups and the second pixel groups are disposed adjacent to each other in horizontal and vertical directions.

12. The 3D imaging device of claim 6, wherein the first pixel groups and the second pixel groups are disposed adjacent to each other in a horizontal direction and are spaced apart in a vertical direction.

13. The 3D imaging device of claim 6, wherein the first pixel groups and the second pixel groups are disposed adjacent to each other in a vertical direction and are spaced apart in a horizontal direction.

14. A three-dimensional (3D) imaging device, comprising:
a time of flight (ToF) sensor including:
a first pixel group including a plurality of first pixels disposed to adjoin each other, wherein the plurality of first pixels is driven for a first time period to output a first phase signal and a second phase signal different from each other;

a second pixel group including a plurality of second pixels disposed to adjoin each other, wherein the plurality of second pixels is driven for the first time period to output a third phase signal and a fourth phase signal different from each other;

a third pixel group including a plurality of third pixels disposed to adjoin each other, wherein the plurality of third pixels is driven for a second time period, which is shorter than the first time period, to output a fifth phase signal and a sixth phase signal different from each other; and a fourth pixel group including a plurality of fourth pixels disposed to adjoin each other, wherein the plurality of fourth pixels is driven for the second time period to output a seventh phase signal and an eighth phase signal different from each other; and a phase pattern processor configured to receive and convert the first, second, third, fourth, fifth, sixth, seventh and eighth phase signals into digital phase values and generate a phase pattern image by arranging the digital phase values in one frame.

15. The 3D imaging device of claim 14, wherein the first, second, third, fourth, fifth, sixth, seventh and eighth phase signals are output during a frame period.

16. The 3D imaging device of claim 14, wherein each of the plurality of first pixels includes:
a first photogate configured to accumulate received light for the first time period and output the first phase signal; and
a second photogate configured to accumulate received light for the first time period and output the second phase signal which has a phase difference of 180 degrees with respect to the first phase signal.

17. The 3D imaging device of claim 14, wherein each of the plurality of second pixels includes:

a third photogate configured to accumulate received light for the first time period and output the third phase signal; and
a fourth photogate configured to accumulate received light for the first time period and output the fourth phase signal which has a phase difference of 180 degrees with respect to the third phase signal.

18. The 3D imaging device of claim 14, wherein each of the plurality of third pixels includes:
a fifth photogate configured to accumulate received light for the second time period and output the fifth phase signal; and
a sixth photogate configured to accumulate received light for the second time period and output the sixth phase signal which has a phase difference of 180 degrees with respect to the fifth phase signal.

19. The 3D imaging device of claim 14, wherein each of the plurality of fourth pixels includes:
a seventh photogate configured to accumulate received light for the second time period and output the seventh phase signal; and
an eighth photogate configured to accumulate received light for the second time period and output the eighth phase signal which has a phase difference of 180 degrees with respect to the seventh phase signal.

20. The 3D imaging device of claim 14, wherein the first phase signal and the third phase signal have a phase difference of 90 degrees,
the second phase signal and the fourth phase signal have a phase difference of 90 degrees,
the fifth phase signal and the seventh phase signal have a phase difference of 90 degrees, and
the sixth phase signal and the eighth phase signal have a phase difference of 90 degrees.

* * * * *